United States Patent [19]
Takeuchi

[11] Patent Number: 5,585,864
[45] Date of Patent: *Dec. 17, 1996

[54] APPARATUS FOR EFFECTING HIGH SPEED TRANSFER OF VIDEO DATA INTO A VIDEO MEMORY USING DIRECT MEMORY ACCESS

[75] Inventor: Kesatoshi Takeuchi, Suwa, Japan

[73] Assignee: Seiko Epson Corporation, Tokyo, Japan

[ * ] Notice: The term of this patent shall not extend beyond the expiration date of Pat. No. 5,546,137.

[21] Appl. No.: 266,676

[22] Filed: Jun. 28, 1994

Related U.S. Application Data

[63] Continuation-in-part of Ser. No. 80,501, Jun. 24, 1993, Pat. No. 5,444,497.

[30] Foreign Application Priority Data

Jun. 24, 1992 [JP] Japan .................... 4-166031
Mar. 25, 1993 [JP] Japan .................... 5-66833
Jun. 14, 1993 [JP] Japan .................... 5-168744
Mar. 7, 1994 [JP] Japan .................... 6-064519
Apr. 24, 1994 [JP] Japan .................... 6-113520

[51] Int. Cl.$^6$ .................................................. G06F 13/28
[52] U.S. Cl. ................... 348/719; 348/561; 364/242.31; 395/492; 395/515
[58] Field of Search .................... 348/581, 561, 348/714, 719; 382/298; 345/127, 121; 395/400, 166, 492; 358/451; 364/242.31; A04N 9/74, 5/44; G06F 13/28

[56] References Cited

U.S. PATENT DOCUMENTS 5,068,731  11/1991  Takeuchi .................. 348/581

FOREIGN PATENT DOCUMENTS 63-34658   2/1988  Japan .................. G06F 13/28
63-89984   4/1988  Japan .................. G06F 13/28
4160458    6/1992  Japan .................. G06F 13/28
4345389   12/1992  Japan .................. H04N 7/01

OTHER PUBLICATIONS

CQ Publishing Co., Feb. 1, 1985, pp. 80–83, Kenji Kinoshita, "Basics, Design and Manufacture of Image Processing System".

Primary Examiner—Victor R. Kostak
Assistant Examiner—John W. Miller
Attorney, Agent, or Firm—Oblon, Spivak, McClelland, Maier & Neustadt, P.C.

[57] ABSTRACT

The present invention realizes high-speed transfer of video data into a video memory. Addresses used in DMA transfer operation are calculated by simple arithmetic operation in a DMA address operation unit of a DMA controller. Video data are transferred according to the addresses at a high speed to an arbitrary position in a VRAM. An FIFO memory unit can expand and reduce a video image by desirable magnifications in both vertical and horizontal directions during DMA transfer of video data.

21 Claims, 34 Drawing Sheets

BP=BPC : CMP=「H」

BP≠BPC : CMP=「L」

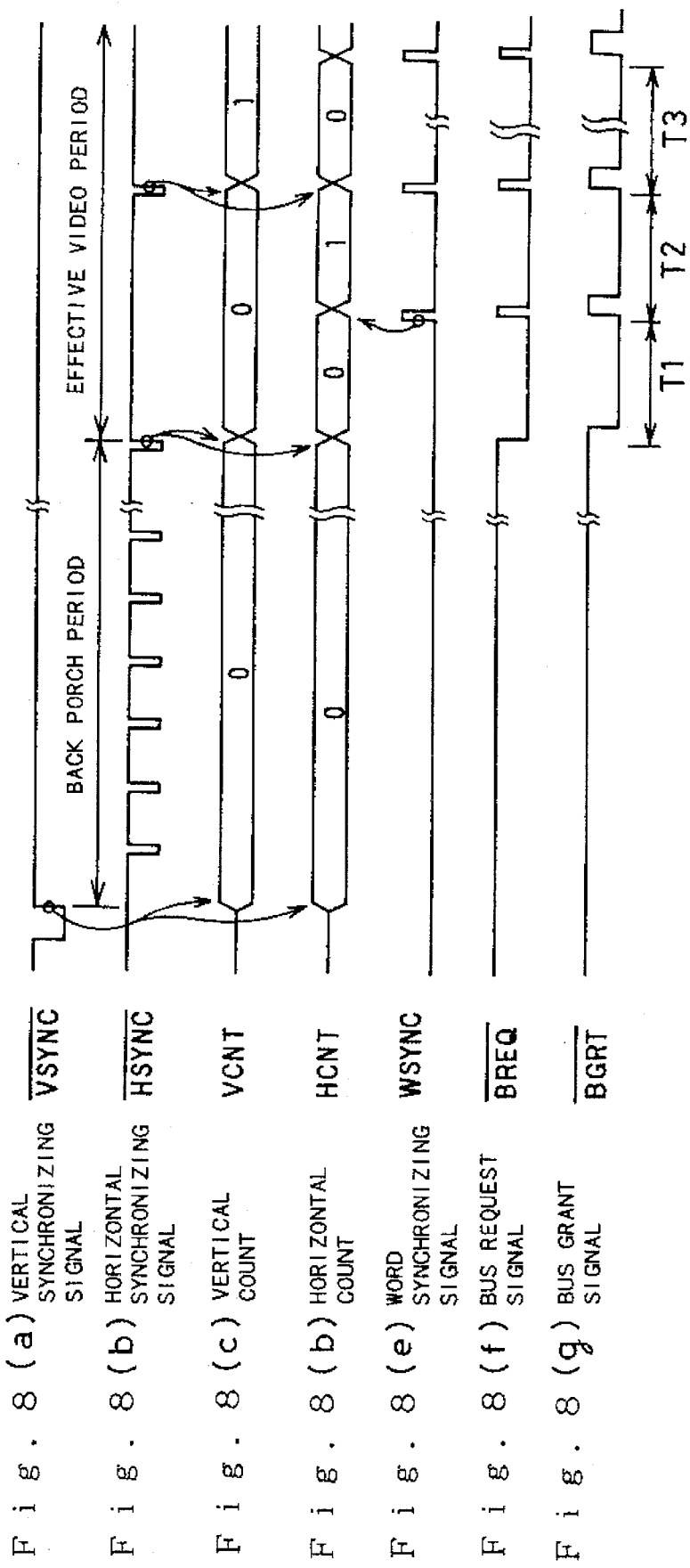

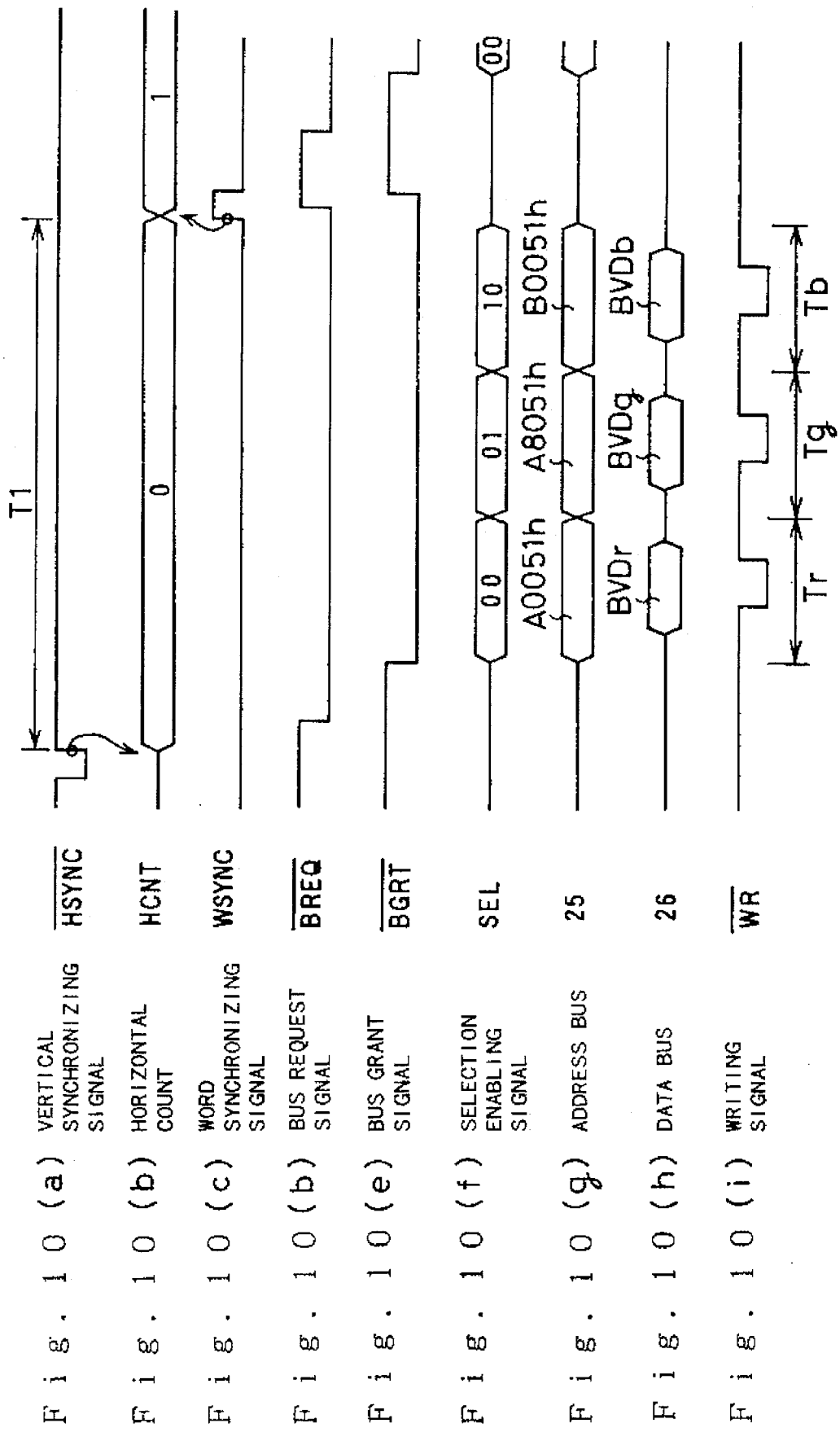

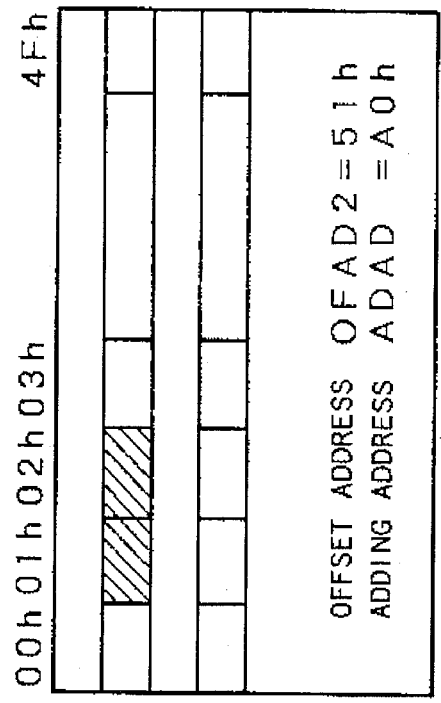
Fig. 11 (A)
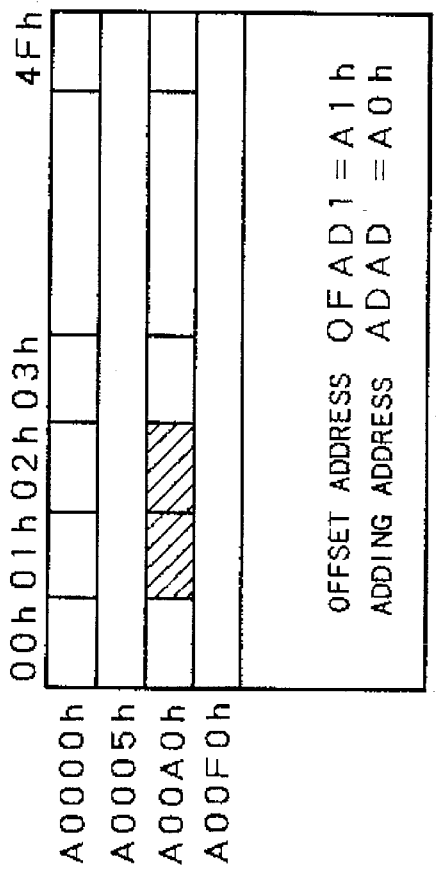
Fig. 11 (B)
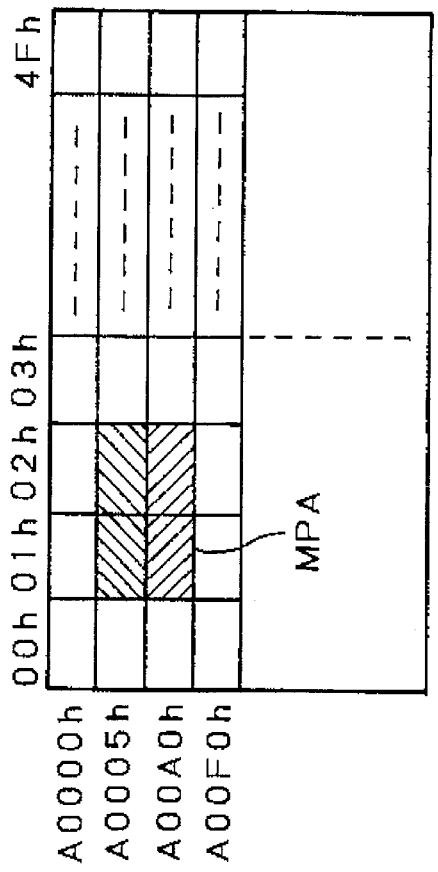
Fig. 11 (C) ONE FRAME

Fig. 18(A)
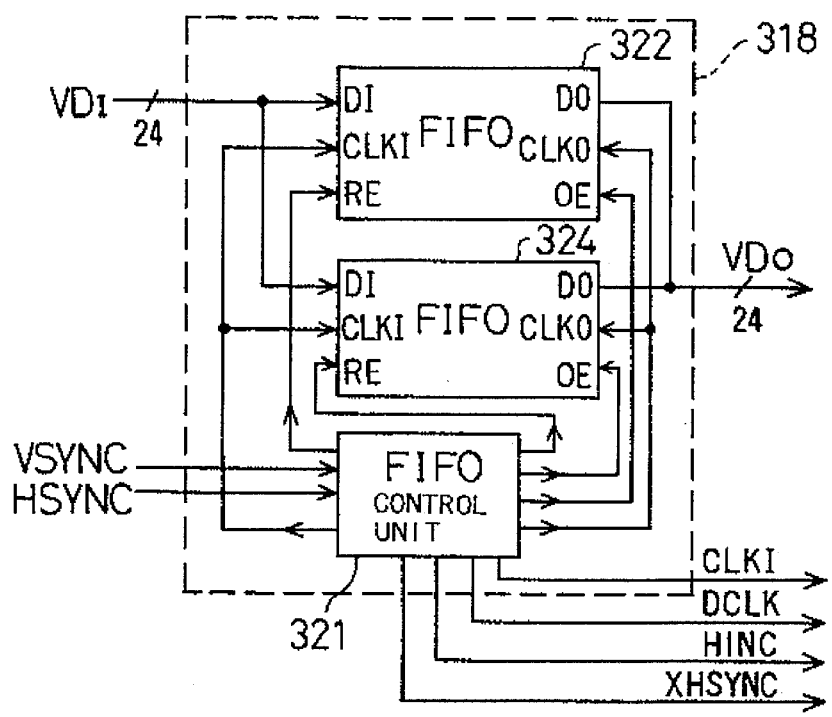
Fig. 18(B)
Fig. 18(C)
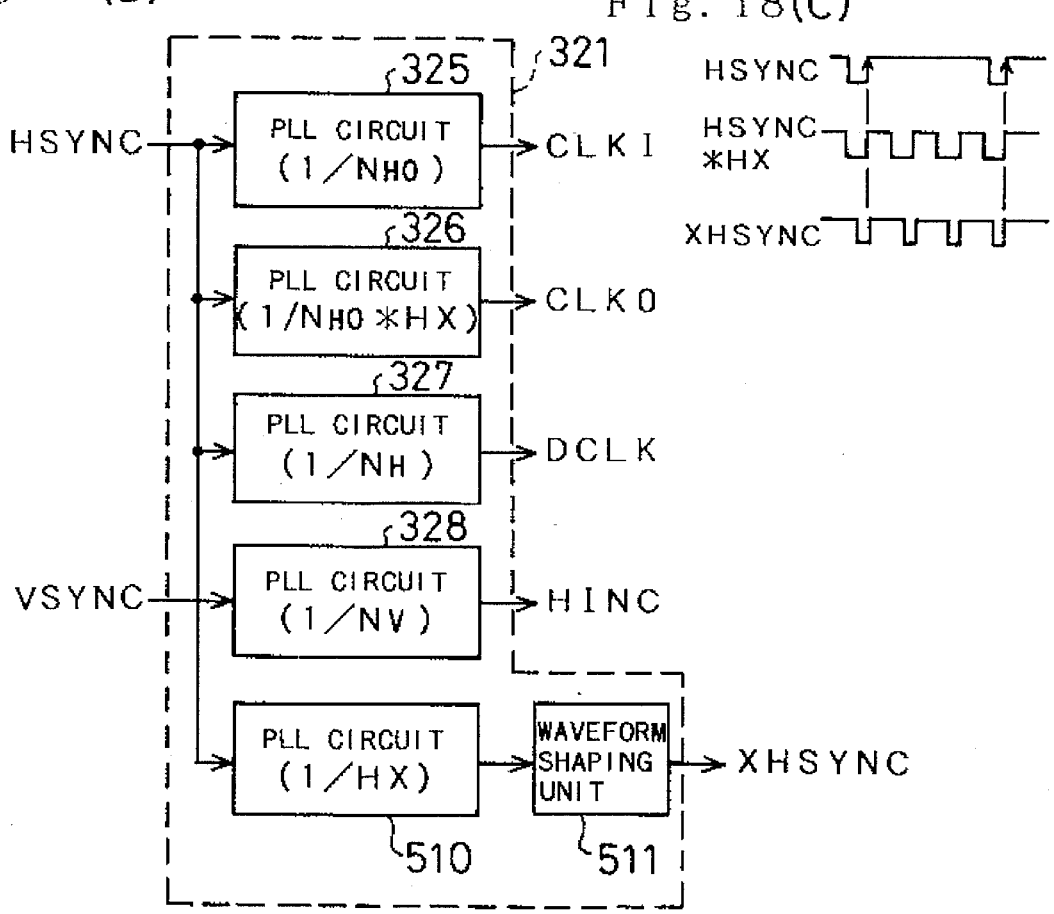

Fig. 20

ADDRESS MAP OF 2-PORT VRAM 212

|  | R | G | B |
|---|---|---|---|
| 0000h | VDr | VDg | VDb |
| 0001h | ↓ | ↓ | ↓ |
| 0002h | | | |
| 0003h | | | |
| 0004h | ↓ | ↓ | ↓ |

← 1 WORD = 24 BITS →

Fig. 21

OFFSET ADDRESS OFAD = 51h
ADDING ADDRESS ADAD = 50h

|  | MPA | | 80 | | | |
|---|---|---|---|---|---|---|
| 0000h | 0h | 1h | 2h | 3h | ------ | 4Fh |
| 0050h | 0h | 1h | 2h | 3h | ------ | 4Fh |
| 00A0h | 0h | 1h | 2h | 3h | ------ | 4Fh |
| 00F0h | 0h | 1h | 2h | 3h | ------ | 4Fh |

81

212

Fig. 27(a) INPUT VIDEO DATA VDI
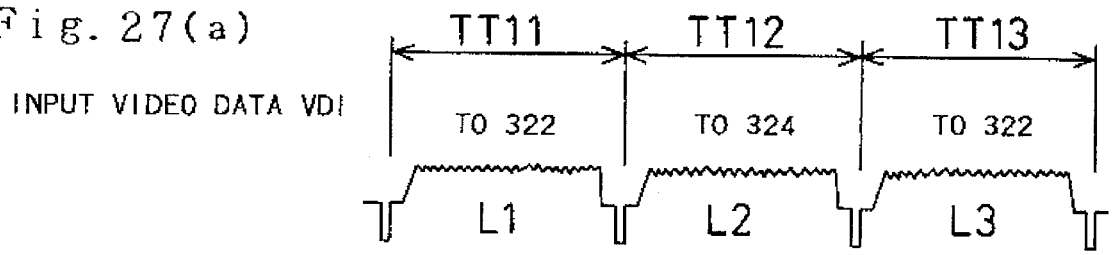
Fig. 27(b) OUTPUT VIDEO DATA VDO
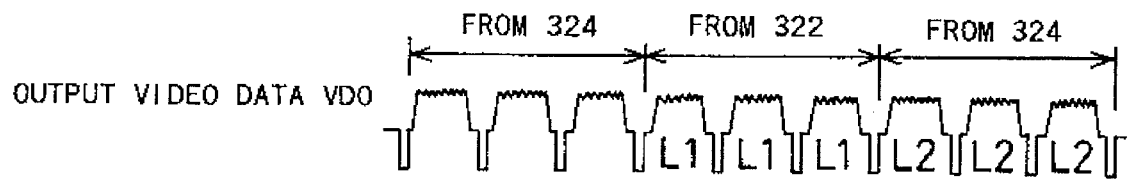
Fig. 27(c)
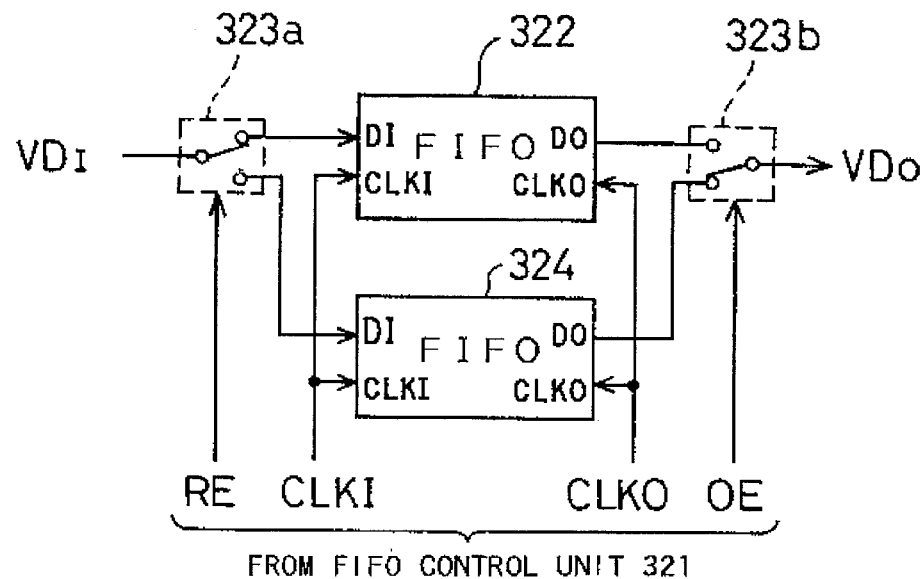
$$fCLKO = HX * fCLKI$$
$$= 3 * fCLKI$$

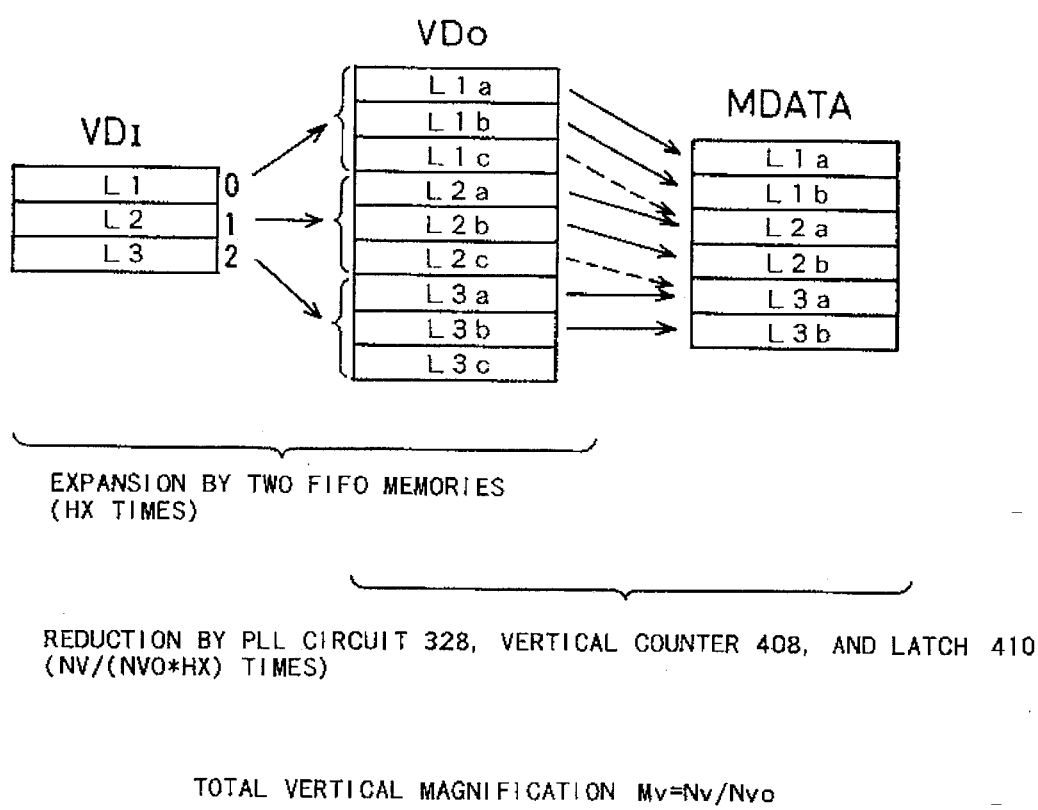

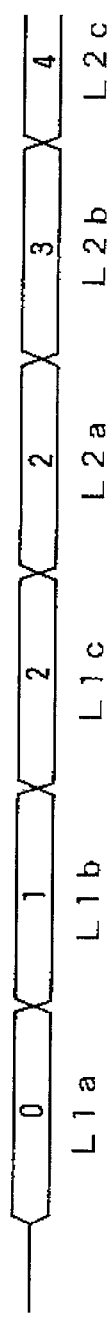
Fig. 29(a) HINC
Fig. 29(b) CNT
Fig. 29(c) XHSYNC
Fig. 29(d) VCNT
VERTICAL IMAGE REDUCTION $(NV/(NV0*HX)=2/3)$
$HINC = fVSYNC * NV$
$fXHSYNC = fVSYNC * NV0 * HX$ (Nvo=262.5 for NTSC Signal)
VERTICAL MAGNIFICATION $= fHINC / fXHSYNC = NV/(NV0*HX)$ Fig. 30(A) VIDEO IMAGE BY VIDEO SIGNAL
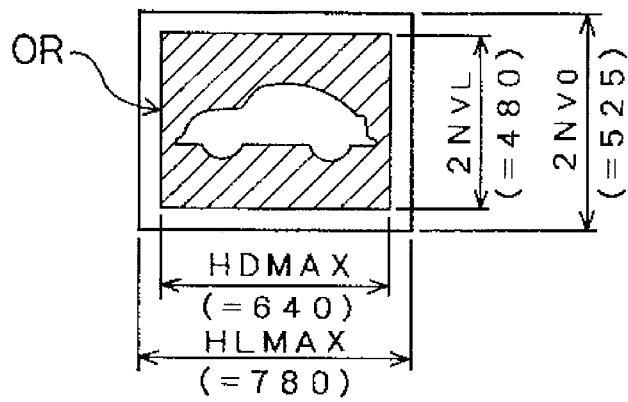
Fig. 30(B) VRAM SPACE
MV: VERTICAL MAGNIFICATION
MH: HORIZONTAL MAGNIFICATION
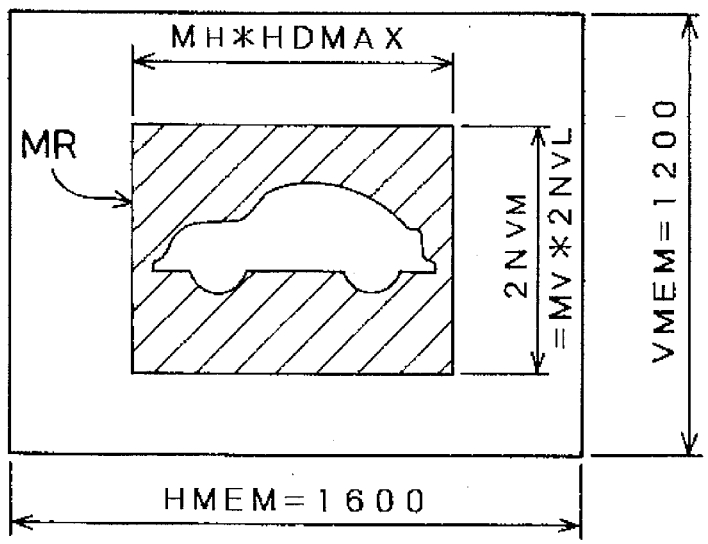
SET VALUE NH OF PLL CIRCUIT 327 $= NHO * MH * HX$
SET VALUE NV OF PLL CIRCUIT 328 $= \dfrac{MV * NVL}{NVL} * NV0 = MV * NV0$
$$NHO = \dfrac{fCLKI}{fHSYNC}, \quad NV0 = \dfrac{fHSYNC}{fVSYNC}$$

INPUT VIDEO DATA VDI

OUTPUT VIDEO DATA VDO

APPARATUS FOR EFFECTING HIGH SPEED TRANSFER OF VIDEO DATA INTO A VIDEO MEMORY USING DIRECT MEMORY ACCESS

CROSS REFERENCE TO RELATED APPLICATION

This application is a continuation-in-part of a patent application Ser. No. 08/080,501, filed Jun. 24, 1993, now U.S. Pat. No. 5,444,497.

BACKGROUND OF THE INVENTION

1. Field of the Invention

The present invention relates to a video data transfer apparatus for transferring video data to a video memory, and also to a computer system having the video data transfer apparatus incorporated therein.

2. Description of the Related Art

The so-called DMA (Direct Memory Access) transfer can be used in transferring video data supplied from an external device to a video memory in a personal computer.

FIG. 39 is a block diagram showing a conventional computer system having a DMA controller for transferring video data to a video RAM. Three video memories 51R, 51G, and 51B store color data Dr, Dg, and Db for red (R), green (G), and blue (B), respectively. These color data Dr, Dg, and Db are previously binarized, for example, by the Dither Method. DMA controller 55 obtains the right of use of an address bus 53, a data bus 52, and a control bus 54 from a CPU 59, and executes real-time transfer of the binary color data Dr, Dg, and Db stored in the three video memories 51R, 51G, and 51B to video RAMs 56R, 56G, and 56B for display. The binary color data Dr, Dg, and Db thus transferred are further sent to a monitor control unit 57 from the VRAMS 56R, 56G, and 56B to display a video image on a monitor 58.

In DMA transfer, the CPU 59 sends a display start address for the VRAM 56R for the R component to the DMA controller 55 to activate the DMA controller 55. The DMA controller 55 obtains the right of use of the buses from the CPU 59; transfers the binary color data Dr of the R Component on a first line to the VRAM 56R for the R component; and returns the right of use of the buses to the CPU 59. The CPU 59 then sends a display start address for the VRAM 56G for the G component to the DMA controller 55 to activate the DMA controller 55, which transfers binary color data Dg in the same manner as for the R component. The B component is also transferred in the same manner. In transferring video data on a second line, the CPU 59 calculates and sends respective display start addresses on the second line for the VRAMs 56R, 56G, and 56B to the DMA controller 55 for successively transferring the binary color data Dr, Dg, and Db of the color components R, G, and B, respectively.

The CPU 59 calculates respective display start addresses on each line for the VRAMs 56R, 56G, and 56B and sends the addresses to the DMA controller 55 in the above manner, and the DMA controller 55 executes DMA transfer of the color data Dr, Dg, and Db on each line accordingly, whereby one field of color data is transferred to the VRAM 56. 'One field' corresponds to an image covered by one-through scanning from the left upper corner to the right lower corner on the screen. In many cases, the two-to-one interlace (or interlace scanning) is performed where two fields compose an image of one frame (or one screen). In this case, the binary color data is transferred by the DMA transfer at a rate of approximately 60 fields per second to display a moving picture on the monitor 58.

One scanning period of one horizontal line is equal to 63 microsecond for NTSC (National Television System Committee) video signals. In the conventional system shown in FIG. 39, only several fields of data can be transferred in each second because the time is consumed by the CPU 59 in calculating and sending the display start addresses to the DMA controller 55, and also consumed by the DMA controller 55 in obtaining the right of use of the buses from the CPU 59 and in the DMA transfer of the binary color data Dr, Dg, and Db on each line. Especially the CPU 59 requires a relatively long time for calculation of the display start addresses and for output of the addresses to the DMA controller 55. As described above, the conventional system transfers only several fields of data per second, and cannot display a smooth moving picture accordingly.

SUMMARY OF THE INVENTION

An object of the invention is to execute high-speed transfer of video data to a video memory.

The present invention is directed to a computer system comprising a CPU; a first video memory for storing video data representing a video image; a video accelerator for controlling writing and reading of the video data into and out of the first video memory; a local bus for electrically connecting the first video memory with the video accelerator; and video data transfer means for transferring the video data into a desired memory region in the first video memory. The video data transfer means comprises a first memory for storing an offset address indicating a start position of the desirable memory area in the first video memory; a second memory for storing an adding address indicating a difference between addresses of two scanning lines adjacent to each other in the first video memory; first operation means for calculating a vertical address as a function of vertical and horizontal synchronizing signals synchronous with the video data, the vertical address being equal to a value of the adding address multiplied by a scanning line number indicating an ordinal number of a scanning line in the video image, the scanning line number being specified by the number of pulses of the horizontal synchronizing signal given to the first operation means; a horizontal counter for generating a horizontal address indicating a difference of an address between an initial position of each scanning line in the video image and each pixel on the each scanning line; second operation means for adding the vertical address, the horizontal address, and the offset address to obtain a transfer address indicating an address in the first video memory corresponding to a position of the each pixel on the each scanning line in the video image, and outputting the transfer address onto the local bus; and data output means for outputting onto the local bus the video data to be transferred to the first video memory according to the transfer address.

Since a transfer address is easily calculated by arithmetical operation in the first and second operation means, the video data will be transferred according to the transfer address at a high speed.

The present invention is also directed to a computer system comprising: a video memory for storing video data; a micro processor for controlling writing and reading of the video data into and out of the video memory; a bus for electrically connecting the video memory with the micro-processor; and DMA transfer means for obtaining a right of use of the bus from the micro-processor, and outputting onto the bus the video data and a transfer address corresponding to a desired memory region in the video memory so as to implement DMA transfer of the video data to the video memory. The DMA transfer means comprises: first variable magnification means for changing a vertical magnification of a video image represented by the video data, and second variable magnification means for changing a horizontal magnification of the video image represented by the video data.

The present invention is further directed to a video data transfer apparatus, for use in a computer system comprising a video memory for storing video data, a micro processor for controlling writing and reading of the video data into and out of the video memory, and a bus for electrically connecting the video memory with the micro-processor, for transferring the video data into a desired memory region in the video memory. The apparatus comprises: a first memory for storing an offset address indicating a start position of the desirable memory area in the video memory; a second memory for storing an adding address indicating a difference between addresses of two scanning lines adjacent to each other in the video memory; first operation means for calculating a vertical address as a function of vertical and horizontal synchronizing signals synchronous with the video data, the vertical address being equal to a value of the adding address multiplied by a scanning line number indicating an ordinal number of a scanning line in the video image, the scanning line number being specified by the number of pulses of the horizontal synchronizing signal given to the first operation means; a horizontal counter for generating a horizontal address indicating a difference of an address between an initial position of each scanning line in the video image and each pixel on the each scanning line; second operation means for adding the vertical address, the horizontal address, and the offset address to obtain the transfer address indicating an address in the video memory corresponding to a position of the each pixel on the each scanning line in the video image, and outputting the transfer address onto the bus; data output means for outputting onto the bus the video data to be transferred to the video memory according to the transfer address; first variable magnification means for changing a vertical magnification of a video image represented by the video data; and second variable magnification means for changing a horizontal magnification of the video image represented by the video data.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8(a) through 8(g) are timing charts showing general operation of the DMA controller 34;

FIGS. 10(a) through 10(i) are timing charts showing transfer of binary video data in the term T1 of FIG. 8;

FIGS. 11(A) through 11(C) show memory spaces for an odd line field and an even line field in interlace scanning;

FIGS. 18(A) and 18(B) are block diagrams illustrating the internal structure of a FIFO memory unit 318;

FIG. 18(C) is a timing chart showing the operation of a PLL Circuit 510;

FIG. 20 is an address map of the dual-port VRAM 212;

FIG. 21 shows a memory space of a dual port VRAM 212 corresponding to a display screen;

FIGS. 27(a) through 27(c) schematically illustrate image expansion operation in the vertical direction;

FIGS. 28(A) through 28(C) show a process of image expansion and reduction in the vertical direction;

FIGS. 29(a) through 29(d) are timing chart showing an image reduction process in the vertical direction;

FIGS. 30(A) and 30(B) show various parameters concerning image expansion and image reduction;

DESCRIPTION OF THE PREFERRED EMBODIMENT

A. First Embodiment

Figure 1:
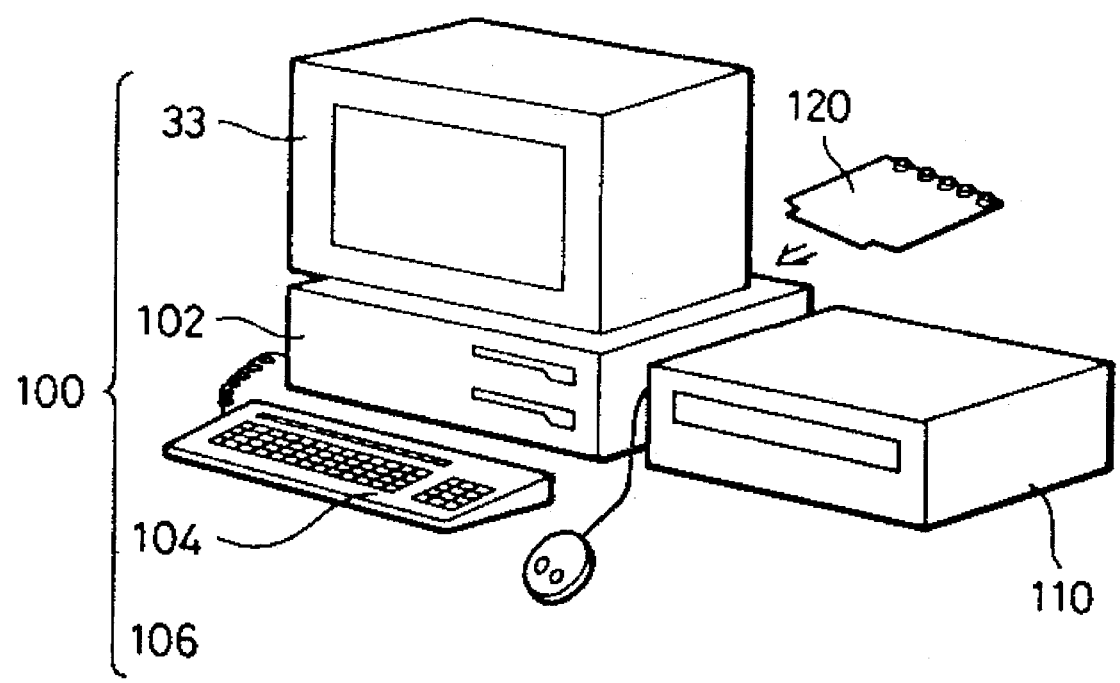
FIG. 1 is a perspective view illustrating a computer system having a DMA controller as a first embodiment of the present invention.

FIG. 1 is a perspective view of a computer system having a DMA controller according to a first embodiment of the present invention. The computer system includes a personal computer 100 and a video player 110. The personal computer 100 consists of a computer main frame 102, a color monitor 33, a keyboard 104, and a mouse 106. A video data transfer unit 120, which is constructed in the form of an extension board, is inserted in an extension slot of the computer main frame 102. The video data transfer unit 120 is connected with a video player 110 via a cable (not shown). The video player 110 outputs video signals, which represents a video image displayed on part of the color monitor 33, to the video data transfer unit 120.

Figure 2:
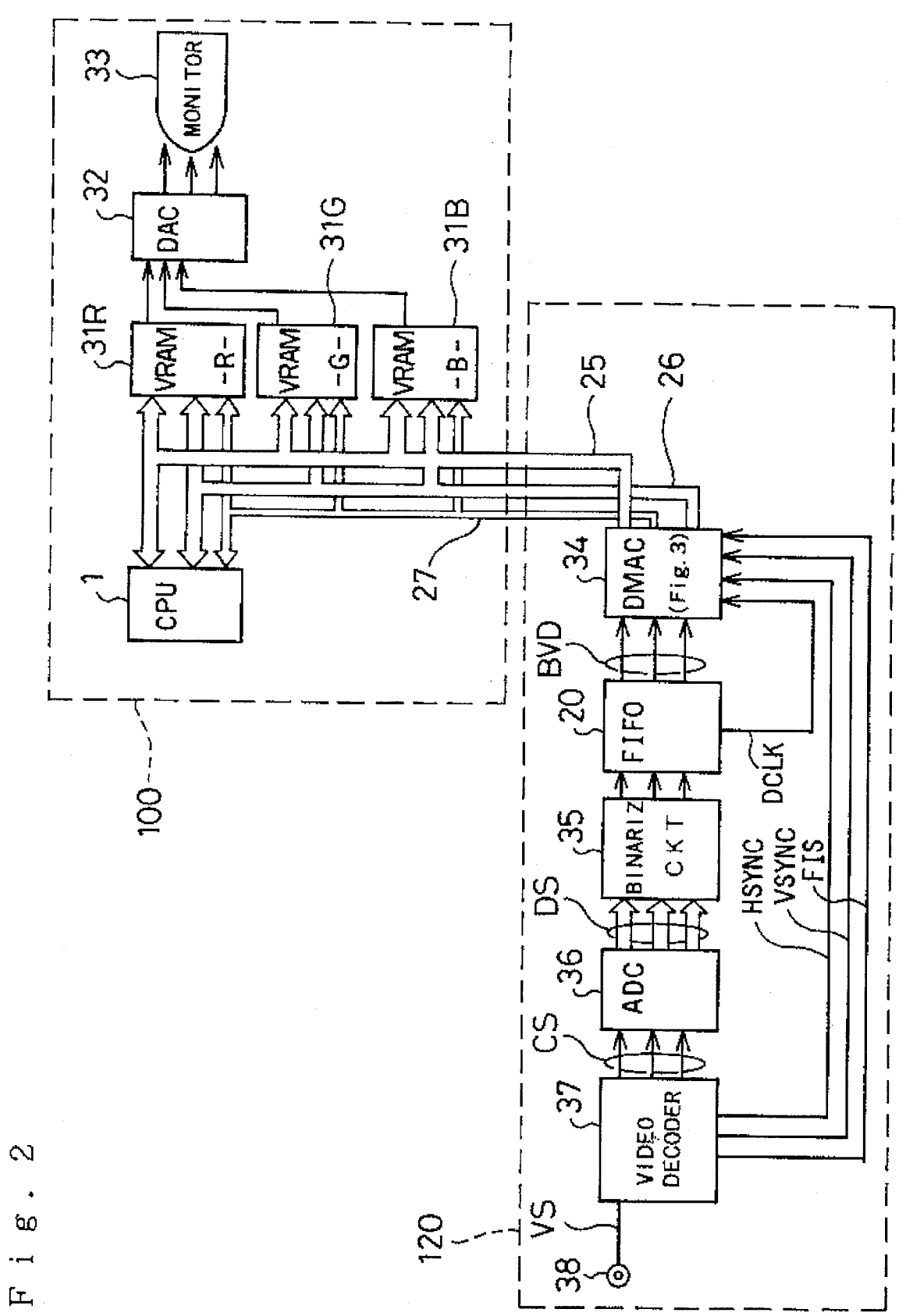
FIG. 2 is a block diagram showing the internal structure of personal computer 100 and video data transfer unit 120.

FIG. 2 is a block diagram showing the internal structure of the personal computer 100 and the video data transfer unit 120. Three VRAMs 31R, 31G, and 31B for the color components R, G, and B, respectively, are address-mapped on a memory map in the personal computer 100. The VRAMs 31R, 31G, and 31B are connected to a CPU 1 via an address bus 25, a data bus 26, and a control bus 27. Video data output from the VRAMs 31R, 31G, and 31B are converted to analog video signals at a D-A converter 32 and transferred to the color monitor 33, and thereby a video image is displayed on the color monitor 33 as a function of the analog video signals.

The video data transfer unit 120 transfers video data to the three VRAMs 31R, 31G, and 31B in the personal computer 100. The video data transfer unit 120 includes a DMA controller 34, an FIFO memory unit 20, a binarization circuit 35, an A-D converter 36, a video decoder 37, and a video signal input terminal 38. In this embodiment, a composite video signal VS is supplied from the video player 110 to the video signal input terminal 38.

The composite video signal VS is decoded by the video decoder 37 to be separated into color signals CS including luminance components of the respective colors R, G, and B, a vertical synchronizing signal /VSYNC, a horizontal synchronizing signal /HSYNC, and a field indication signal FIS. The field indication signal FIS indicates whether the video signal is for an odd field or for an even field in the case of interlace scanning.

The color signals CS are converted from analog to digital by the A-D converter 36, and the digital video data DS are binarized by the binarization circuit 35. The details of the binarization circuit 35 will be described later.

Binary video data BVD obtained by the binarization circuit 35 are stored in the FIFO memory unit 20. The binary video data BVD are output from the FIFO memory unit 20 as serial data, and converted to parallel data in the DMA controller 34 to standby. The DMA controller 34 then obtains the right of use of the address bus 25, the data bus 26, and the control bus 27 from the CPU 1, and transfers the R, G, and B components of the binary video data BVD to the VRAMs 31R, 31G, and 31B, respectively.

Figure 3:
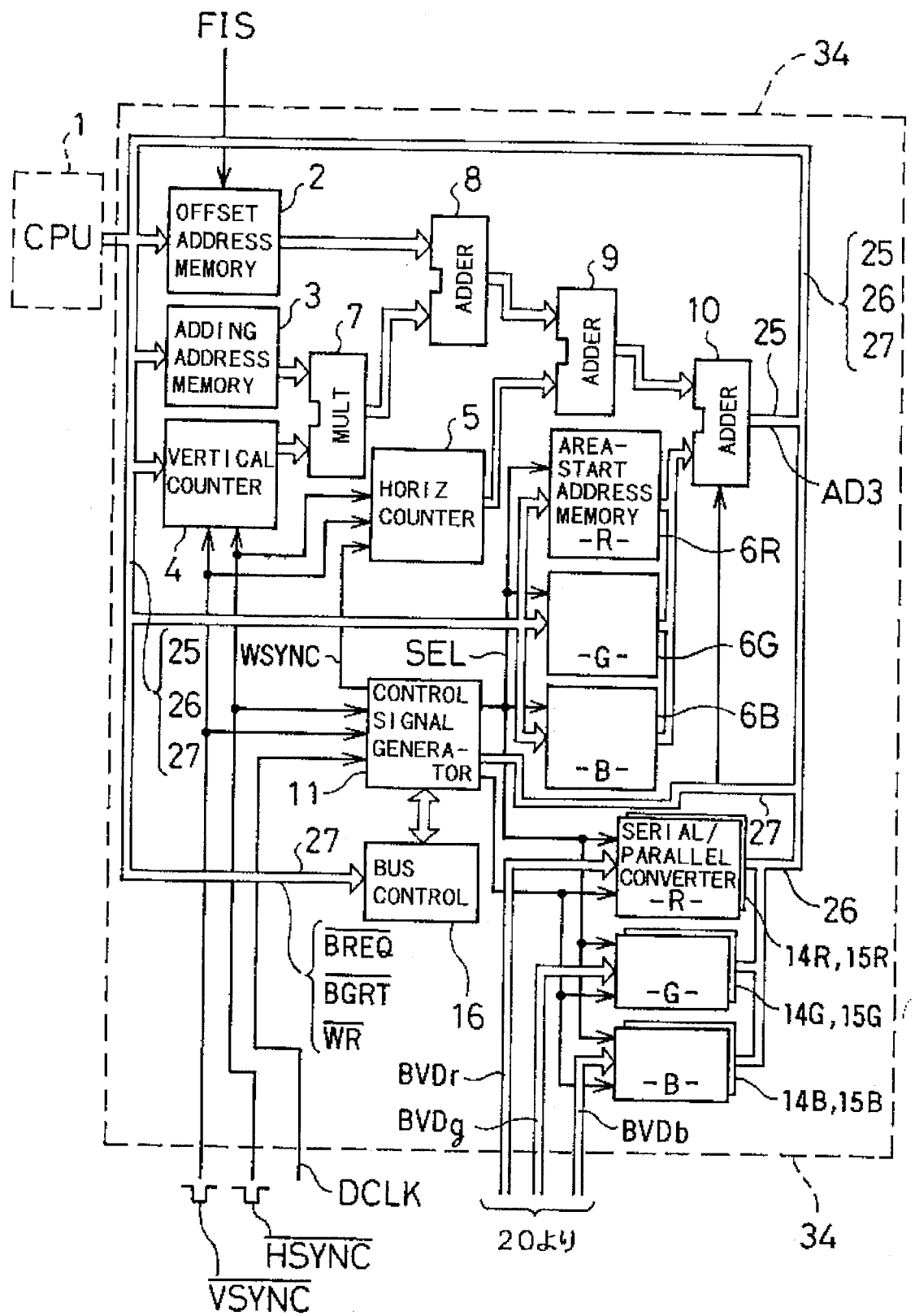
FIG. 3 is a block diagram showing the internal structure of DMA controller 34.

FIG. 3 is a block diagram showing the internal structure of the DMA controller 34. The DMA controller 34 comprises an offset address memory unit 2; an adding address memory unit 3; a vertical counter unit 4; a horizontal counter unit 5; three area-start address memory units 6R, 6G, and 6B; a multiplier 7; and three adders 8, 9, and 10. The multiplier 7 multiplies an adding address stored in the adding address memory unit 3 by a vertical count output from the vertical counter unit 4. The first adder 8 adds the product in the multiplier 7 to an offset address (described later) stored in advance in the offset address memory unit 2. The second adder 9 adds the sum in the first adder 8 to a horizontal count in the horizontal counter unit 5. The third adder 10 adds the sum in the second adder 9 to one of area-start addresses (described later) for the color components R, G, and B stored in the three area-start address memory units 6R, 6G, and 6B, respectively. An output AD3 from the third adder 10 becomes an access address in DMA transfer. Each of the third adder 10 and the three area-start address memory units 6R, 6G, and 6B have a tri-state output.

The DMA controller 34 further comprises a control signal generator 11; two sets of serial-to-parallel converters 14R, 14G, 14B and 15R, 15G, 15B; and a bus control unit 16. Binary video data BVDr, BVDg, and BVDb output in serial order from the FIFO memory unit 20 (FIG. 2) are respectively converted to 8-bit parallel data by the three serial-to-parallel converters 14B, 14G, 14B or 15R, 15G, 15B. Each of the serial-to-parallel converters 14B, 14G, 14B, 15R, 15G, and 15B has a tri-state output.

An output terminal of each serial-to-parallel converter is maintained in the high-impedance state until the 8-bit binary video data obtained by the parallel conversion are transferred to the VRAMs 31R, 31G, and 31B (FIG. 2). While one set of the serial-to-parallel converters output the binary video data BVDr, BVDg, and BVDb onto the data bus 26, the other set executes the serial-to-parallel conversion. The two sets of the serial-to-parallel converters are alternately switched every time when the 8-bit parallel data is obtained for the respective binary video data BVDr, BVDg, and BVDb. Namely, the two sets of serial-to-parallel converters alternately executes serial-parallel conversion and data output.

B. Method of Writing Data into VRAM

Figure 4:
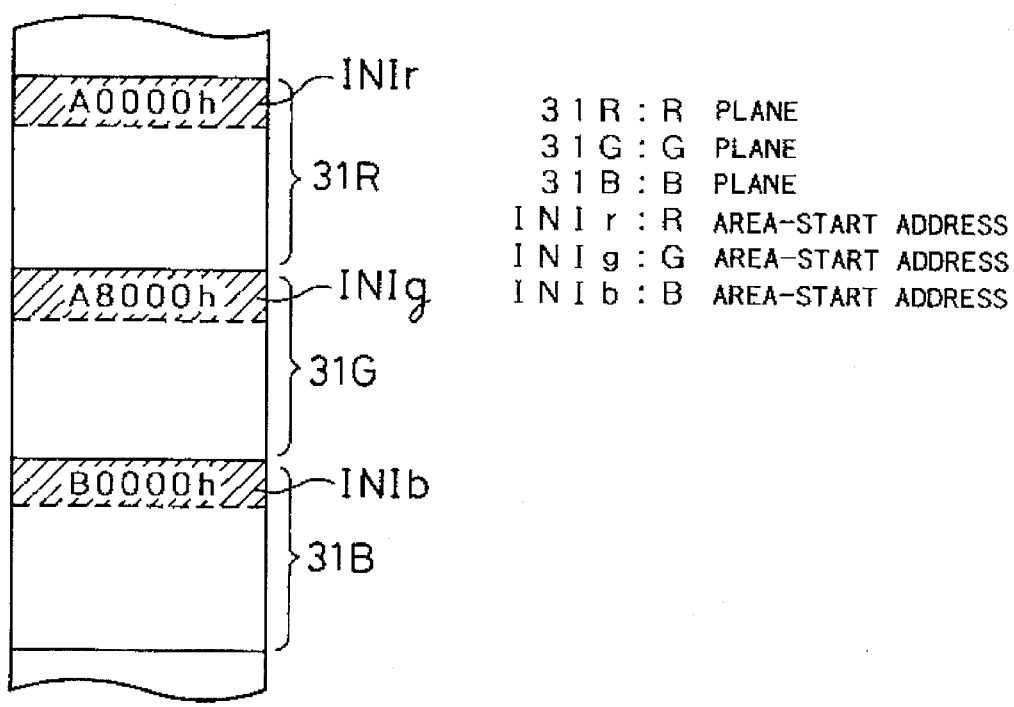
FIG. 4 is a memory map of the three VRAMs 31R, 31G, and 31B.

FIG. 4 is a memory map of the three VRAMs 31R, 31G, and 31B. Memory spaces of the three VRAMs 31R, 31G, and 31B are hereinafter referred to as R plane, G plane, and B place, respectively. An area-start address INIr of the R plane 31R is set at A0000h; an area-start address INIg of the G plane 31G at A8000h; and an area-start address INIb of the B plane 31B at B0000h; where the additional letter "h" denotes hexa-decimal notation. Each of the planes 31R, 31G, and 31B occupies an area of 32 kilo-bytes.

Figure 5:
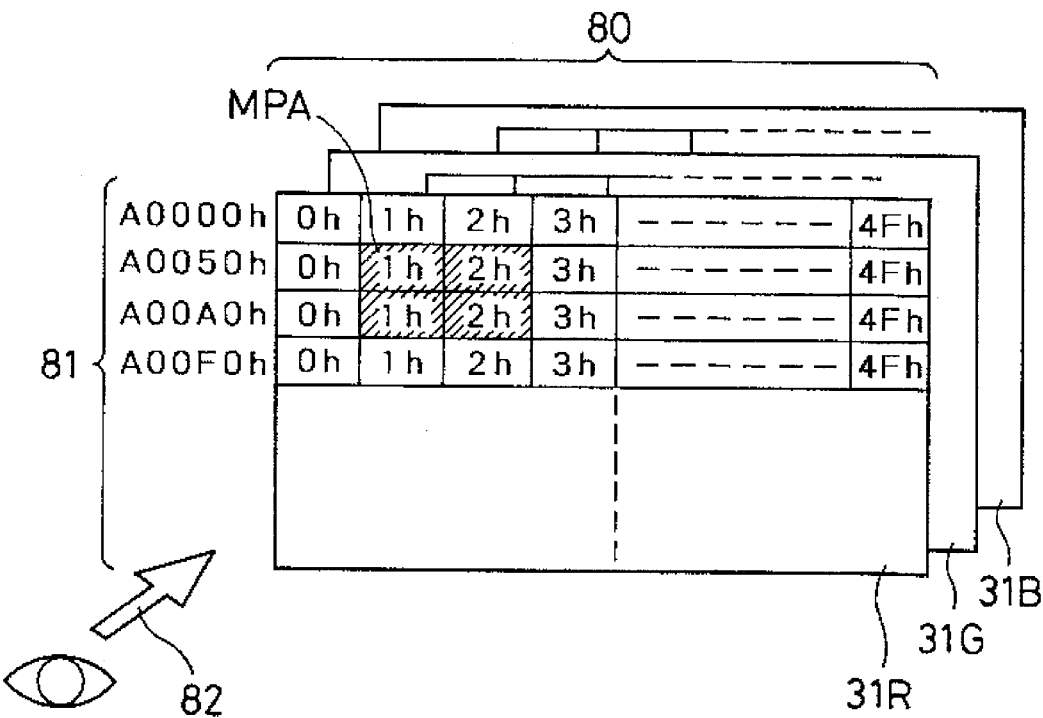
FIG. 5 shows a relationship between each plane 31R, 31G, and 31B and the screen.

FIG. 5 shows a relationship between the planes 31R, 31G, and 31B and the screen. Each of the R plane 31R, the G plane 31G, and the B plane 31B corresponds to a screen which includes a plurality of dots, or pixels, corresponding to 50h bytes in a horizontal range 80, and 199h (=409) scanning lines in a vertical range 81. Since a video image is represented by the binary video data in this embodiment, one dot on the screen corresponds to one bit of video data. Therefore the width (=50h bytes) of the horizontal range 80 on the screen corresponds to a width of 640 pixels. In this embodiment, a moving picture area MPA, shaded in FIG. 5, in which the video data of a moving picture is written through DMA transfer, has a 2-byte horizontal width from the second byte and a 2-line vertical width from the second line in each plane. The moving picture area MPA in the memory space corresponds to an area specified by the operator on the screen of the color monitor 33.

Figure 6:
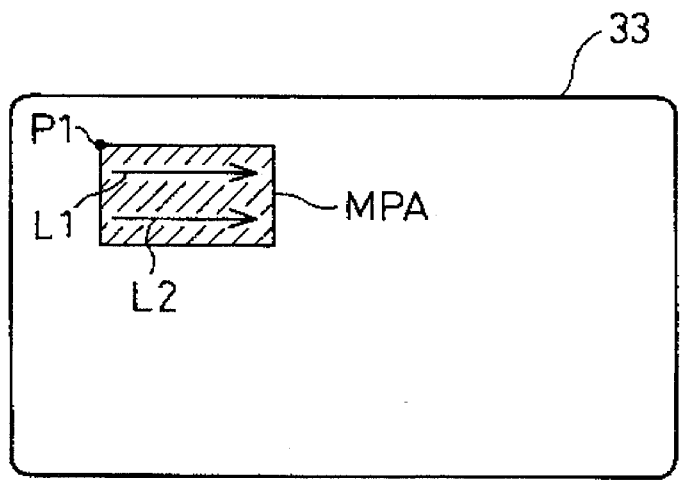
FIG. 6 is a plan view showing a moving picture area MPA within the screen of color monitor 33.

FIG. 6 is a plan view showing the moving picture area MPA specified on the screen of the color monitor 33. The memory space shown in FIG. 5 uniquely corresponds to the display screen of the color monitor 33 shown in FIG. 6. By seeing from a direction 82 indicated in FIG. 5, the moving picture area MPA has a 16-dot horizontal width between the 9th dot from the left and the 24th dot, and a 2-line vertical width on the second and third lines from the top. Explanation will be made first for the case without the interlace scanning for convenience of simplicity. Address operation for the case with the interlace scanning will be described later.

Figure 7:
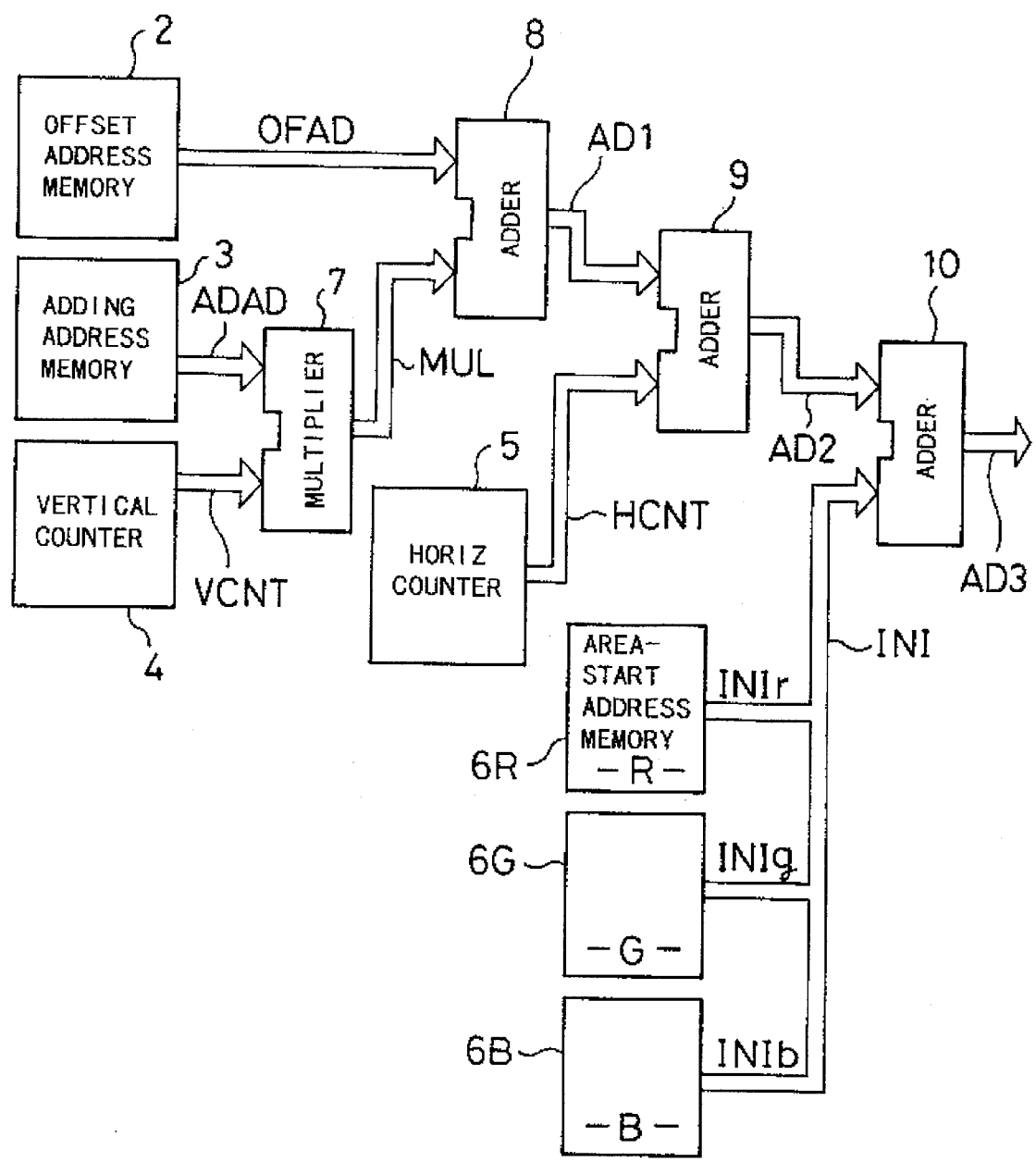
FIG. 7 is an enlarged block diagram showing an address operation unit in the DMA controller 34.

FIG. 7 is an enlarged block diagram showing an address operation unit in the DMA controller 34. An offset address OFAD stored in the offset address memory unit 2 represents an offset value between the area-start address INIr and an address (A0051h) at a writing start position of the moving picture area MPA in the R plane 31R shown in FIG. 5, for example, and it is equal to the difference (=51h) between the area-start address INIr and the writing start address. The offset address OFAD is common to all color components.

The writing start address (=A0051h) is determined according to the position of a left upper point P1 of the moving picture area MPA specified on the screen by the operator (FIG. 6). When the operator specifies a moving picture area MPA on the screen, the CPU 1 calculates a writing start address (=A0051h) corresponding to the left upper point P1, computes the difference between the writing start address (=A0051h) and the area-start address INIr (=A0000h) to obtain an offset address OFAD, and writes the offset address OFAD in the offset address memory unit 2. The operator can set a moving picture area MPA of desirable dimensions at a desirable position, and the offset address OFAD is determined accordingly.

An adding address ADAD stored in the adding address memory unit 3 is equal to the number of bytes on one scanning line in each memory plane, and is set at 50h bytes in this embodiment. The area-start addresses INIr, INIg, and INIb of the R, G, and B planes (FIG. 4) are set in the area-start address memory units 6R, 6G, and 6B, respectively.

An output MUL of the multiplier 7 and outputs AD1 through AD3 of the three adders 8 through 10 are respectively given as follows:

$$MUL = ADAD \times VCNT \quad (1)$$

$$AD1 = OFAD + MUL \quad (2)$$

$$AD2 = AD1 + HCNT \quad (3)$$

$$AD3 = AD2 + INI \quad (4)$$

where INI denotes one of the three area-start addresses INIr, INIg, and INIb.

Outputs AD3r, AD3g, and AD3b for the respective color components R, G, and B from the third adder 10 are given as follows from the above equations (1) through (4):

$$AD3r = (ADAD \times VCNT) + OFAD + HCNT + INIr \quad (5R)$$

$$AD3g = (ADAD \times VCNT) + OFAD + HCNT + INIg \quad (5G)$$

$$AD3b = (ADAD \times VCNT) + OFAD + HCNT + INIb \quad (5B)$$

The vertical count VCNT indicates an ordinal number of scanning line in the moving picture area MPA. The horizontal count HCNT indicates a position from the left end point on each scanning line in the unit of dot, and corresponds to the horizontal address in the present invention. The output MUL of the multiplier 7 corresponds to the vertical address in the present invention.

The equations (5R), (5G), and (5B) give addresses AD3r, AD3g, and AD3b of the respective color planes 31R, 31G, and 31B, where the addresses correspond to a position defined by the vertical count VCNT and the horizontal count HCNT. Since ADAD=50h, OFAD=51h, INIr=A0000h, INIg=A8000h, and INIb=B0000h in this embodiment, the equations (5R), (5G), and (5B) are rewritten as follows:

$$AD3r = (50h \times VCNT) + 51h + HCNT + A0000h \quad (6R)$$

$$AD3g = (50h \times VCNT) + 51h + HCNT + A8000h \quad (6G)$$

$$AD3b = (50h \times VCNT) + 51h + HCNT + B0000h \quad (6B)$$

As described later, the vertical count VCNT is increased by one every time when each scanning line is completed in the moving picture area MPA (FIG. 6), and the horizontal count HCNT is increased by one every time when the 8-bit binary video data of the color components R, G, and B are DMA-transferred on each scanning line. As a result, the binary video data BVD representing a video image within the moving picture area MPA are written in the VRAMs 31R, 31G, and 31B according to the addresses given by the equations (6R), (6G), and (6B).

C. Data Transfer Operation

FIG. 8 is a timing chart showing general operation of the DMA controller 34. When the video decoder 37 outputs a vertical synchronizing signal /VSYNC indicating initiation of one field to the DMA controller 34, the vertical counter unit 4 and the horizontal counter unit 5 are reset and initialized to zero.

The vertical synchronizing signal /VSYNC is followed by a back porch period. The back porch period is identical with a vertical blanking period and does not include effective video data. In FIG. 8, the cycle of a horizontal synchronizing signal /HSYNC is shortened in the back porch period for convenience of illustration. The symbol '/' attached at the front of a signal name denotes a negative logic signal, which is expressed as the line over the signal name in the drawings.

When the video decoder 37 outputs a first horizontal synchronizing signal /HSYNC of an effective video period after completion of the back porch period, the horizontal counter unit 5 is reset to zero for stand-by while the vertical counter unit 4 starts counting-up.

Figure 9:
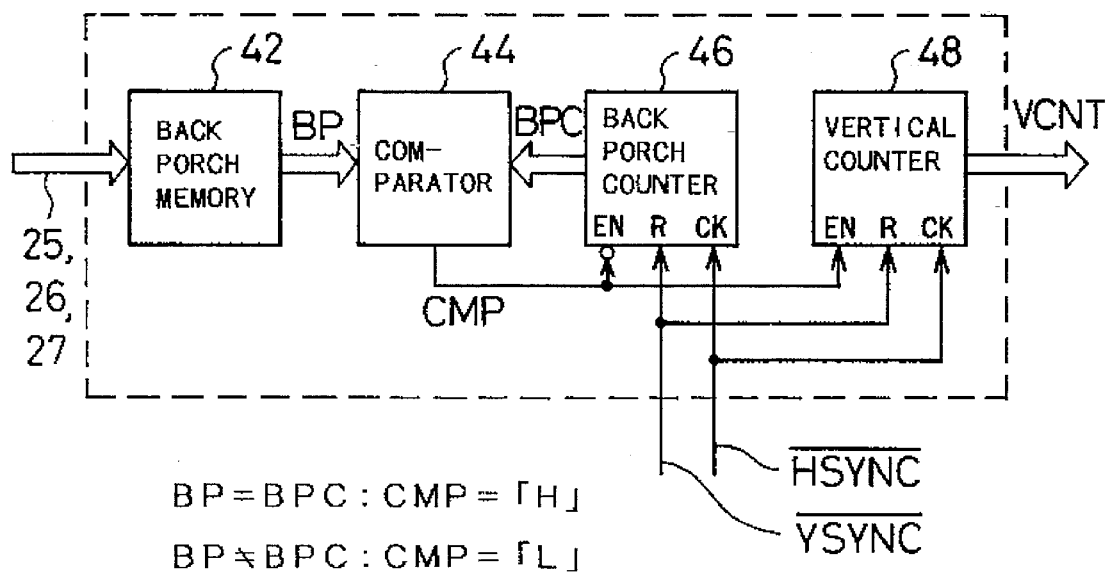
FIG. 9 is a block diagram showing the internal structure of vertical counter unit 4.

FIG. 9 is a block diagram showing the internal structure of the vertical counter unit 4. The vertical counter unit 4 includes a back porch memory 42, a comparator 44, a back porch counter 46, and a vertical counter 48. The back porch memory 42 stores back porch number BP given from the CPU 1 via the buses 25, 26, and 27. The back porch number BP denotes the number of pulses of the horizontal synchronizing signal generated in the back porch period. The horizontal synchronizing signal /HSYNC is supplied to clock input terminals of the back porch counter 46 and the vertical counter 48, respectively, and the vertical synchronizing signal /VSYNC is supplied to reset input terminals of the back porch counter 46 and the vertical counter 48, respectively. The comparator 44 compares the back porch number BP stored in the back porch memory 42 with the count BPC in the back porch counter 46. An output CMP of the comparator 44 becomes at H level when BP is equal to BPC, and at L level when BP is not equal to BPC. The back porch counter 46 is enabled when the output CMP of the comparator 44 is at L level, whereas the vertical counter 48 is enabled when the output CMP is at H level.

When the vertical counter unit 4 receives the vertical synchronizing signal /VSYNC, the back porch counter 46 and the vertical counter 48 are reset to zero. Since the output CMP of the comparator 44 is at L level at that moment, the back porch counter 46 is enabled to count the number of pulses of the horizontal synchronizing signal /HSYNC, while the vertical counter 48 is not operating. When the back porch counter 46 receives the horizontal synchronizing signals /HSYNC by the number equal to the back porch number BP, that is, when BP becomes equal to BPC. As a result, the output CMP of the comparator 44 becomes at H level, whereby the back porch counter 46 stops counting and the vertical counter 48 starts counting up. During the effective video period, the number of pulses of horizontal synchronizing signal /HSYNC is counted to be the vertical count VCNT.

The control signal generator 11 receives a dot clock signal DCLK, which is used as a synchronizing signal when the FIFO memory unit 20 is buffering video data. The control signal generator 11 executes a variety of control operations described below in synchronism with the dot clock signal DCLK.

The first set of serial-to-parallel converters 14G, and 14B convert serial binary video data BVD given from the FIFO memory unit 20 to parallel display-array data, and is standing by while holding their outputs high-impedance. Meanwhile, the control signal generator 11 gives an instruction to the bus control unit 16 to output a bus request signal /BREQ to the CPU 1. The CPU 1 subsequently gives a bus grant signal /BGRT to the bus control unit 16 to give the right of use of the buses 25, 26, and 27 to the DMA controller 34.

FIG. 10 is a timing chart showing transfer of binary video data in a term T1 shown in FIG. 8. When the bus control unit 16 receives the bus grant signal /BGRT from the CPU 1, the control signal generator 11 sends a selection enabling signal SEL to the area-start address memory units 6R, 6G, and 6B as well as the serial-to-parallel converters 14R, 14G, and 14B. The selection enabling signal SEL is a 2-bit signal, where its values '00', '01', and '10' represent R component, G component, and B component, respectively. Namely, one of the three area-start address memory units 6R, 6G, and 6B and one of the serial-to-parallel converters 14R, 14G, and 14B are enabled to output according to the selection enabling signal SEL.

The R component is selected in a term Tr of FIG. 10 because the selection enabling signal SEL has the value '00'. Therefore the address AD3r given by the above equation (6R) is output from the adder 10 onto the address bus 25. At the beginning of the DMA transfer, the equation (6R) gives AD3r=A0051h because VCNT=0h and HCNT=0h. This address corresponds to a writing start position of the moving picture area MPA shown in FIG. 5. Meanwhile, the serial-to-parallel converter 14R outputs the R component BVDr of the binary video data onto the data bus 26. When the control signal generator 11 outputs a writing signal /WR onto the control bus 27, the binary video data BVDr is written in the VRAM 31R for the R plane.

In the next term Tg, the selection enabling signal SEL becomes '01' to select the G component, and the address AD3g given by the equation (6G) is output from the adder 10 onto the address bus 25, accordingly. The address AD3g is equal to A8051h at the beginning of DMA transfer. Meanwhile, the serial-to-parallel converter 14G outputs the G component BVDg of the binary video data onto the data bus 26. When the control signal generator 11 outputs a writing signal /WR onto the control bus 27, the binary video data BVDg is written in the VRAM 31G for the G plane. In the subsequent term Tb, the B component BVDb of binary video data is written in the VRAM 31B for the B plane in the same manner as above.

When one word (8-bit) of each of the binary video data BVDr, BVDg, and BVDb for the respective color components R, G, and B is transferred in the term T1 of FIG. 8, the control signal generator 11 outputs a word synchronizing signal WSYNC to the horizontal counter unit 5. Actually, the control signal generator 11 outputs the word synchronizing signal WSYNC every time when receiving eight clocks of the dot clock signal DCLK from the FIFO memory unit 20. The horizontal counter unit 5 counts up the horizontal count HCNT by one in response to the word synchronizing signal WSYNC. The bus control unit 16 changes the bus request signal /BREQ to H level; returns the right of use of the buses to the CPU 1; and standby.

In the term T1, subsequent 8-bit binary video data BVDr, BVDg, and BVDb are also given from the FIFO memory unit 20 to the second set of serial-to-parallel converters 15R, 15G, and 15B for parallel conversion. The control signal generator 11 supplies the word synchronizing signal WSYNC to the two sets of serial-to-parallel converters other than the horizontal counter unit 5, whereby the two sets of serial-to-parallel converters are alternated in response to the word synchronizing signal WSYNC. Namely, at the end of the term T1, the first set of serial-to-parallel converters 14R, 14G, and 14B starts serial-parallel conversion while the second set of serial-to-parallel converters 15R, 15G, and 15B standby for data transfer.

In transfer during the next term T2, the equations (6R), (6G), and (6B) give AD3r=A0052h, AD3g=A8052h, and AD3b=B0052h, respectively, because VCNT=0h and HCNT=1h. These addresses AD3r, AD3g, and AD3b correspond to a right upper part of the moving picture area MPA shown in FIG. 5.

The R component BVDr of binary video data is transferred to the VRAM 31R at the addresses A0051h and A0052h shown in FIG. 5 in the terms T1 and T2. The G component BVDg of the binary video data is transferred to the VRAM 31G at the addresses A8051h and A8052h while the B component BVDb is transferred to the VRAM 31B at the addresses B0051h and B0052h. This means that data transfer is completed for a first scanning line L1 in the moving picture area MPA of FIG. 6 in the terms T1 and T2. At the end of the term T2, the video decoder 37 outputs a horizontal synchronizing signal /HSYNC indicating completion of the first scanning line and start of a second scanning line to the DMA controller 34 (see FIG. 8).

The vertical counter unit 4 increases the vertical count VCNT by one to make VCNT=1h in response to the horizontal synchronizing signal /HSYNC indicating the start of a next term T3, whereas the horizontal count HCNT in the horizontal counter unit 5 is reset to zero. The R component BVDr of binary video data is then transferred to the VRAM 31R at the addresses A00A1h and A00A2h shown in FIG. 5 in the same manner as above. The G and B components of the binary video data are also transferred in the same manner.

When data transfer is completed for all the scanning lines L1 and L2 in the moving picture area MPA (see FIG. 6), the vertical synchronizing signal /VSYNC is output from the video decoder 37 to the DMA controller 34, and the vertical counter unit 4 and the horizontal counter unit 5 are reset to zero accordingly. As a result, the DMA controller 34 is initialized to stand by until receiving binary video data of the next field.

As described above, both the vertical count VCNT and the horizontal count HCNT are reset to zero every time when the vertical synchronizing signal /VSYNC is supplied. Every time when the horizontal synchronizing signal /HSYNC is supplied, on the other hand, the vertical count VCNT is increased by one while the horizontal count HCNT is reset to zero. The horizontal count HCNT is increased by one in response to the word synchronizing signal WSYNC every time when one word (8-bit) of each of the binary video data BVDr, BVDg, and BVDb for the respective color components R, G, and B are DMA-transferred. Since the addresses for the VRAMs 31R, 31G, and 31B are calculated on the basis of the vertical count VCNT and the horizontal count HCNT according to the equations (6R), (6G), and (6B), the addresses for the VRAMS are successively updated in synchronism with the vertical synchronizing signal /VSYNC, the horizontal synchronizing signal /HSYNC, and the word synchronizing signal WSYNC. This results in transferring the binary video data BVDr, BVDg, and BVDb representing a video image within the moving picture area MPA to the VRAMs 31R, 31G, and 31B at about every 1/60 second to display a moving picture.

The VRAMs 31R, 31G, and 31B are two port memories, which allow the DMA controller 34 to write data therein irrespective of the timing of reading data therefrom to the D-A converter 32.

D. Address Operation in Interlace Scanning

FIG. 11 shows memory spaces of an odd line field and an even line filed in interlace scanning. Although FIG. 11 corresponds to FIG. 5, only the R plane is shown for convenience of illustration. The odd line field includes only two addresses A00A1h and A00A2h out of four addresses in the moving picture area MPA while the even line field has the other two addresses A0051h and A0052h.

In interlace scanning, an offset address OFAD1=A1h for the odd line field and an offset address OFAD2=51h for the even line field are registered in the offset address memory unit 2 (see FIG. 3). The offset address memory unit 2 selectively outputs one of the two offset addresses OFAD1 and OFAD2 according to the field indication signal FIS supplied from the video decoder 37. In two-to-one interlacing, the adding address ADAD is twice (=A0h) the value (=50h) for non-interlacing. The offset address OFAD and the adding address ADAD are thus adjusted in interlace scanning, and the addresses of video data are given by the equations (5R), (5G), and (5B) in the same manner as the non-interlace scanning described above.

In transferring video data produced for interlacing, video data for the odd line field and those for the even line field may be written in the same address without performing the interlacing on purpose. In such a case, the offset address OFAD and the adding address ADAD for non-interlacing can be used for both the fields.

In the above embodiment, video data is DMA-transferred to display a moving picture on the monitor 33 in the computer system having an inexpensive CPU without using a special processor. Since the DMA controller 34 effectively displays a moving picture on the monitor 33 without applying an undesirable load onto the CPU, it is not required to re-design the hardware related to the video processing in CPU equipment. In other words, a moving picture corresponding to video data can be displayed simply by inserting a circuit board or card including the DMA controller 34 into the extension slot of an ordinary computer.

Since the address operation unit of the DMA controller 34 (see FIG. 7) consists of one multiplier and a plurality of adders, it can obtain addresses at a high speed. The system does not require video memories other than VRAMs 31R, 31G, and 31B of the personal computer 100 for DMA transfer, the video data transfer unit 120 (see FIG. 2) has a relatively simple circuit structure and is manufactured at a relatively low cost.

E. Details of Binarization Circuit 35 and FIFO Unit 20

Figure 12:
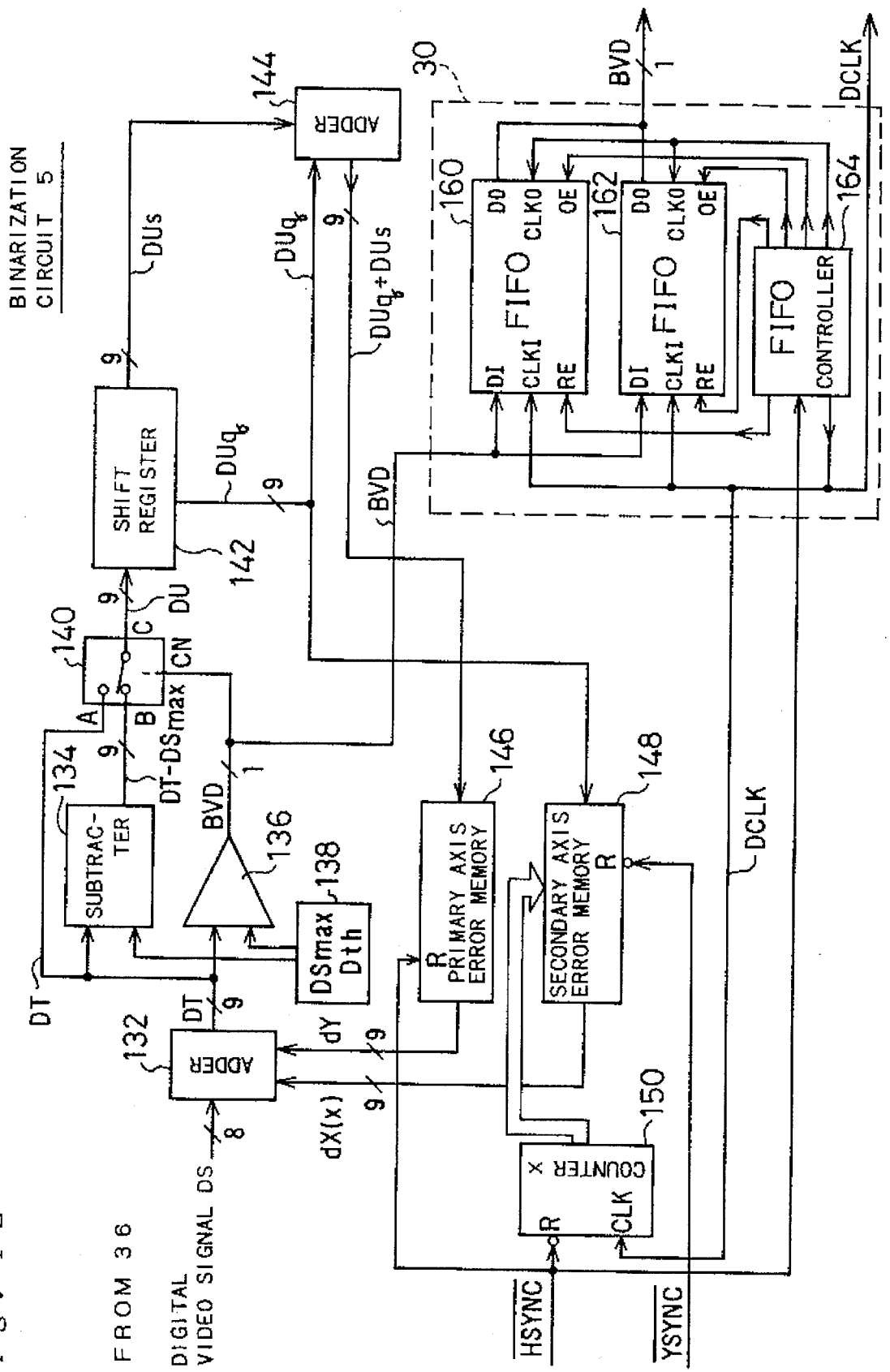
FIG. 12 is a block diagram showing the internal structure of binarization circuit 35.

FIG. 12 is a block diagram showing the internal structure of the binarization circuit 35 and the FIFO memory unit 20. Binarizing method in the binarization circuit 35 is improved from a so-called Error Diffusion Method, which allows high-speed generation of binary video data having a natural tone expression by dividing errors caused in binarizing process into a primary axis (in the vertical direction on the screen) and a secondary axis (in the horizontal direction on the screen).

The binarization circuit 35 comprises a first adder 132, a subtracter 134, a comparator 136, a parameter memory 138, a selector 140, a shift register 142, a second adder 144, a primary axis error memory 146, a secondary axis error memory 148, and a counter 150. The binarization circuit 35 is implemented as a simple gate array including approximately 4,000 gates. The FIFO memory unit 20 includes two FIFO memories 160 and 162 and an FIFO controller 164.

Figure 13:
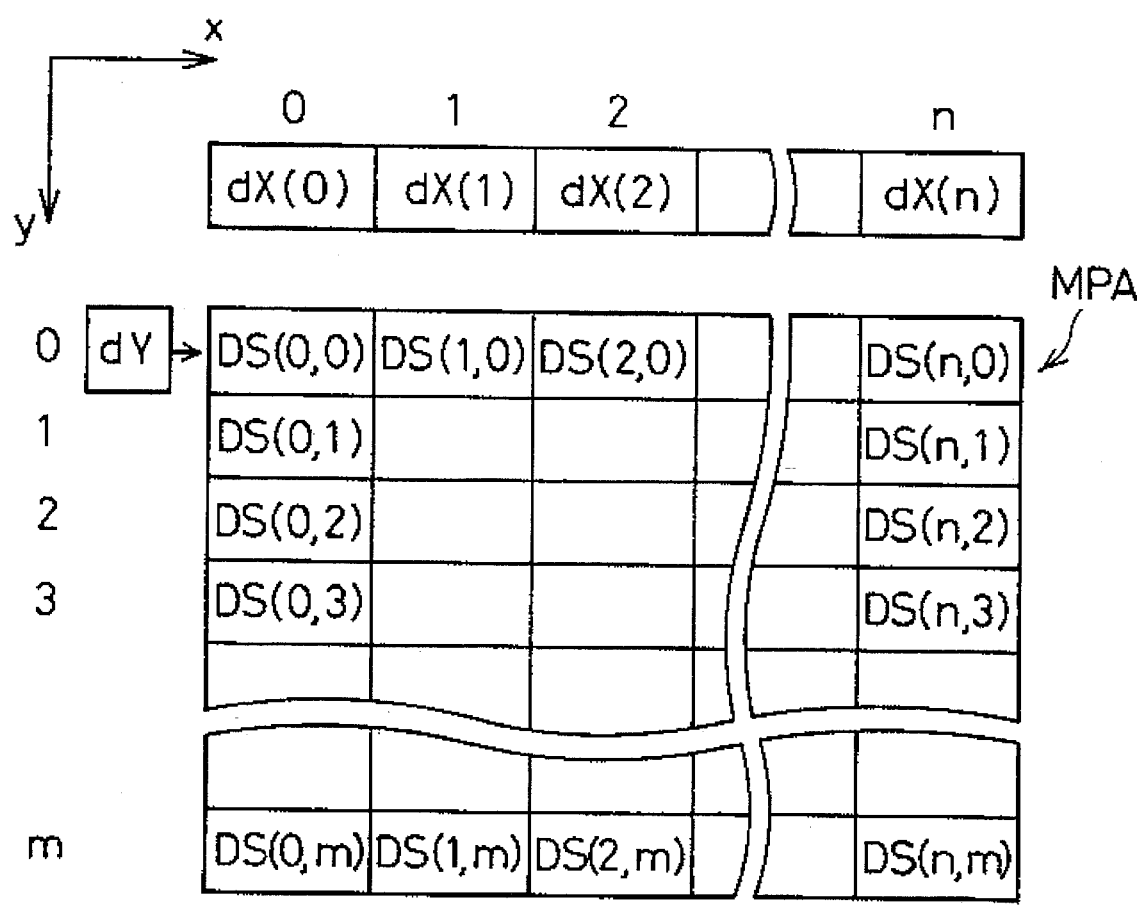
FIG. 13 is a plan view showing an array of multi-digit video signals DS against a secondary axis error dX(x) and a primary axis error dY.

FIG. 13 is a plan view showing an arrangement of multi-digital video signals DS against a secondary axis error dX(x) and a primary axis error dY. The digital video signal DS has a two-dimensional arrangement in the moving picture area MPA. The maximum coordinate value n along the secondary axis x, or the horizontal axis in the moving picture area MPA, is the quantization number for the moving picture area MPA, and so is the maximum coordinate value m along the primary axis y, or the vertical axis. In the above embodiment, n=(2×8−1)=15 and m=1. The secondary axis errors dX(x) are assigned to respective coordinates x along the horizontal axis while one value of the primary axis error dY is assigned to the scanning line under processing.

Figure 14:
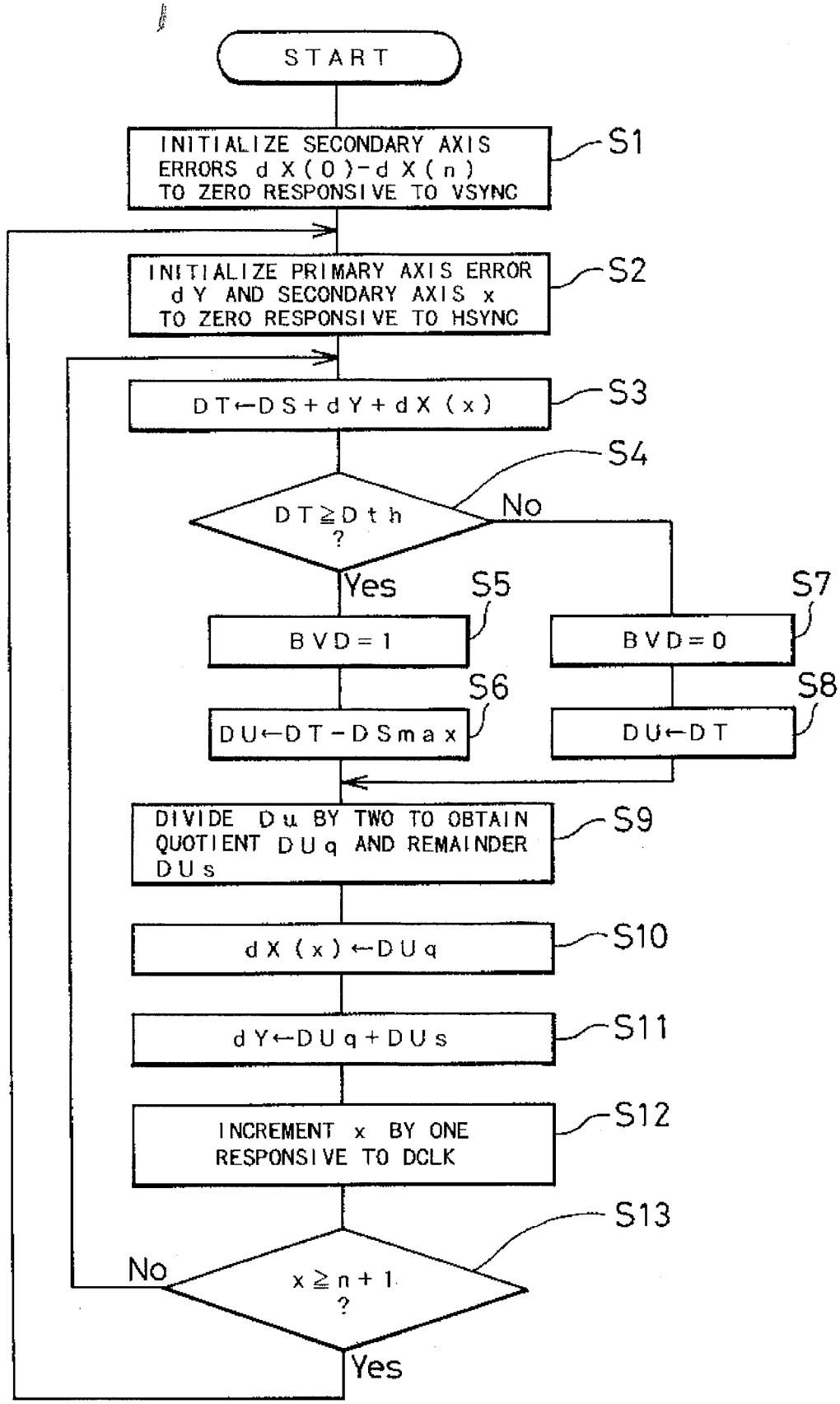
FIG. 14 is a flowchart showing operation of the binarization circuit 35.

FIG. 14 is a flowchart showing the operation of the binarization circuit 35. When the vertical synchronizing signal /VSYNC is supplied from the video decoder 37, the secondary axis errors dX(0) through dX(n) in the secondary axis error memory 148 are initialized to zero (step S1). When the horizontal synchronizing signal /HSYNC is subsequently supplied from the video decoder 37, the primary axis error dY in the primary axis error memory 146 is initialized to zero, and the counter 150 is reset (step S2). The count in the counter 150 indicates the secondary coordinate value x. The FIFO controller 164 supplies the dot clock signal DCLK to the counter 150, which then counts up the secondary coordinate value x in response to the dot clock signal DCLK, and the steps S3 through S13 are executed accordingly. The dot clock signal DCLK is also supplied to the two FIFO memories 160 and 162, and the video data binarized at each secondary coordinate x is stored in either of the two FIFO memories 160 and 162.

At step S2, the FIFO controller 164 alternates the operation modes of the two FIFO memories 160 and 162 in response to the horizontal synchronizing signal /HSYNC such that one FIFO memory is write-enabled and read-inhibited and the other FIFO memory is read-enabled and write-inhibited. Since the horizontal synchronizing signal /HSYNC indicates completion of one scanning line and start of a next scanning line, the alternation of the operation modes of the two FIFO memories 160 and 162 makes it possible that one FIFO memory is storing the binary video data BVD for one scanning line while the other FIFO memory is outputting the binary image data BVD.

At step S3, the first adder 132 adds the primary axis error dY, the secondary axis error dX(x), and the multi-digital video signal DS to generate corrected video data DT. The corrected video data DT consists of a sign bit showing plus or minus, and an absolute value part. DT is equal to DS immediately after the vertical synchronizing signal /VSYNC and the horizontal synchronizing signal /HSYNC are given because both the primary axis error dY and the secondary axis error dX are initialized to zero. The corrected video data DT is supplied to the subtracter 134 and the comparator 136. The subtracter 134 outputs a value (DT−DSmax) obtained by subtracting an effective maximum value DSmax of the multi-digital video signal DS from the corrected video data DT. The comparator 136 compares the corrected video data DT with a threshold value Dth (step S4). The maximum value DSmax and the threshold value Dth are stored in advance in the parameter memory 138. The threshold value Dth can be any value within a range between (minimum value+1) and (maxim value−1) in the gradation of the multi-digital video signal DS.

The value of the binary video data BVD output from the comparator 136 becomes one when DT is no less than Dth (step S5), and it becomes zero when DT is less than Dth (step S7).

The binary video data BVD is also supplied to the selector 140, which selects one of the corrected video data DT and the output (DT−DSmax) of the subtracter 134 according to the binary video data BVD. The selector 140 selects the output (DT−DSmax) as an output DU with a sign bit when BVD is equal to one (step S6), and the selector 140 selects the corrected video data DT as the output DU with a sign bit when BVD is equal to zero (step S8).

At step S9, the shift register 142 shifts the absolute value part of the output DU from the selector 140 by one bit to the right and adds the sign bit to the post-shift value. This right shift is equivalent to an operation of dividing the output DU by two. The shift register 142 outputs a quotient DUq with a sign bit and a remainder DUs. The remainder DUs is constituted by the sign bit and the least significant bit of the data DU before shift.

The quotient DUq is stored as the secondary axis error dX(x) in the secondary axis error memory 148 (step S10) while a sum (DUq+DUs) of the quotient DUq and the remainder DUs is stored as the primary axis error dY in the primary axis error memory 146 (step S11). Since the secondary axis error dX(x) is allocated to a specific secondary coordinate x, it is used for the same secondary coordinate x on the next scanning line. On the other hand, since the primary axis error dY has only one value, it is used for the binarizing process at the next coordinate (x+1).

At step S12, the secondary coordinate x in the counter 150 is increased by one in response to the dot clock signal DCLK supplied from the FIFO controller 164. The binary video data BVD is written in one of the FIFO memories 160 and 162 while it is read out of the other to be given to the DMA controller 34.

When the secondary coordinate x is not greater than the maximum value n, the program returns to step S3 to repeat the processing of steps S3 through S13. Namely, the multi-digital video signals DS (0,0) through DS (n,0) shown in FIG. 13 are successively binarized at respective values of the secondary coordinate x=0 through n.

When x becomes equal to n+1, the horizontal synchronizing signal /HSYNC is supplied from the video decoder 37, and the processing from step S2 is restarted. Since the horizontal synchronizing signal /HSYNC indicates completion of one scanning line and start of a next scanning line as mentioned above, the multi-digital signals DS(0,1) through DS(n,1) on the next scanning line are subject to the processing then. The operation modes of the two FIFO memories 160 and 162 are alternated in response to the horizontal synchronizing signal /HSYNC as described before.

The binarization circuit 35 binarizes all the multi-digital signal DS in the moving picture area MPA through the repeated execution of steps S1 through S13.

The binarization circuit 35 described above divides an error caused by binarizing the digital video signal DS into the primary axis error dY and the secondary axis error dX(x), and corrects the video signal DS by adding the errors dY and dX(x) to the video signal DS in the binarizing process for the next dot or for the next scanning line. The binary video data BVD is generated accordingly which can comparatively accurately reproduce the gradation of an original video image. The overall processing can be executed at a high-speed because the error caused by binarization is simply divided into the primary axis error dY and the secondary axis error dX(x).

F. Modifications of the First Embodiment (1) The present invention is applicable to processing of other types of video signals other than RGB color signals, such as YUV signals used in NTSC system.

(2) The present invention is also applicable to DMA transfer of multi-digital video data without binarizing digital video signals DS. In such a case, the binarization circuit 35 in FIG. 2 is omitted, and the serial-to-parallel converters 14R, 14G, 14B, 15R, 15G, and 15B in FIG. 3 are replaced by three-state buffers. The three cycles Tr, Tg, and Tb in FIG. 10 can be shortened to one cycle by arranging the VRAMs 31R, 31G, and 31B shown in FIG. 4 on one plane and using a memory map in which the three color components R, G, and B are expressed by one word.

(3) Use of a three-port memory for the VRAMs 31R, 31G, and 31B, and data-transfer from the DMA controller 34 via a local bus negate the necessity of obtaining the right of use of buses from the CPU 1, thus realizing higher-speed data transfer and further improving the moving picture quality.

Signals shown in FIGS. 10(g), 10(h), and 10(i) represent only examples and may be modified in any desirable form.

(4) The present invention is applicable to a process of restoring compressed digital video data and writing the restored data into the VRAMs. In such a case, the video decoder 37 and the A-D converter 36 are replaced by an image restoration unit.

(5) The circuit of calculating the address AD3 according to the equations (5R), (5G), and (5B) can have another structure. For example, the adder in the DMA controller 34 can be replaced by a subtracter, or alternatively the sequence of addition can be changed to obtain the same results.

The multiplier 7 shown in FIG. 3 can be replaced by an adder and an up-counter, and in such a case the adding address ADAD stored in the adding address memory 3 is added up by the number of times indicated by the vertical count VCNT in the vertical counter unit 4.

Figure 15:
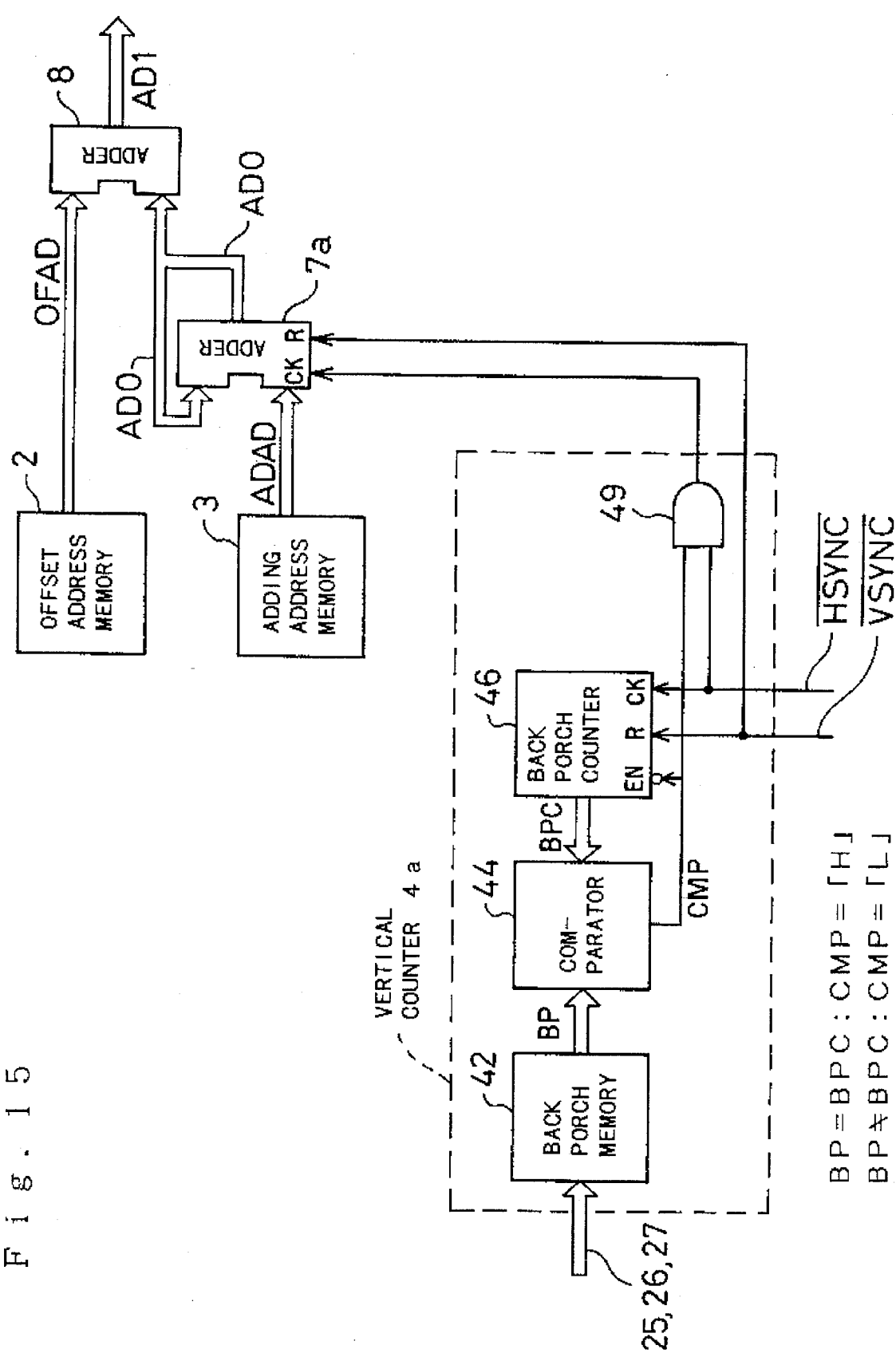
FIG. 15 is a block diagram showing another circuit structure including an adder 7a in place of multiplier 7.

As shown in FIG. 15, the multiplier 7 can replaced by an adder 7a, whose first input receives the adding address ADAD and whose second input receiving an output AD0 of the adder 7a itself. A vertical counter unit 4a in FIG. 15 has the same structure as the vertical counter unit 4 shown in FIG. 9 other than an AND circuit 49 in place of the vertical counter 48. The AND circuit 49 receives the output CMP from the comparator 44 and the horizontal synchronizing signal /HSYNC. The AND circuit 49 outputs the horizontal synchronizing signal /HSYNC in the effective video period after the back porch period. The horizontal synchronizing signal /HSYNC output from the AND circuit 49 is supplied to a clock input terminal of the adder 7a. The adder 7a also receives the vertical synchronizing signal /VSYNC at a reset input terminal thereof. The output AD0 of the adder 7a therefore shows the same value as the output MUL of the multiplier 7 shown in FIG. 3. Replacement of the multiplier 7 by the adder 7a further simplifies the circuit structure.

G. Structure of Second Embodiment

Figure 16:
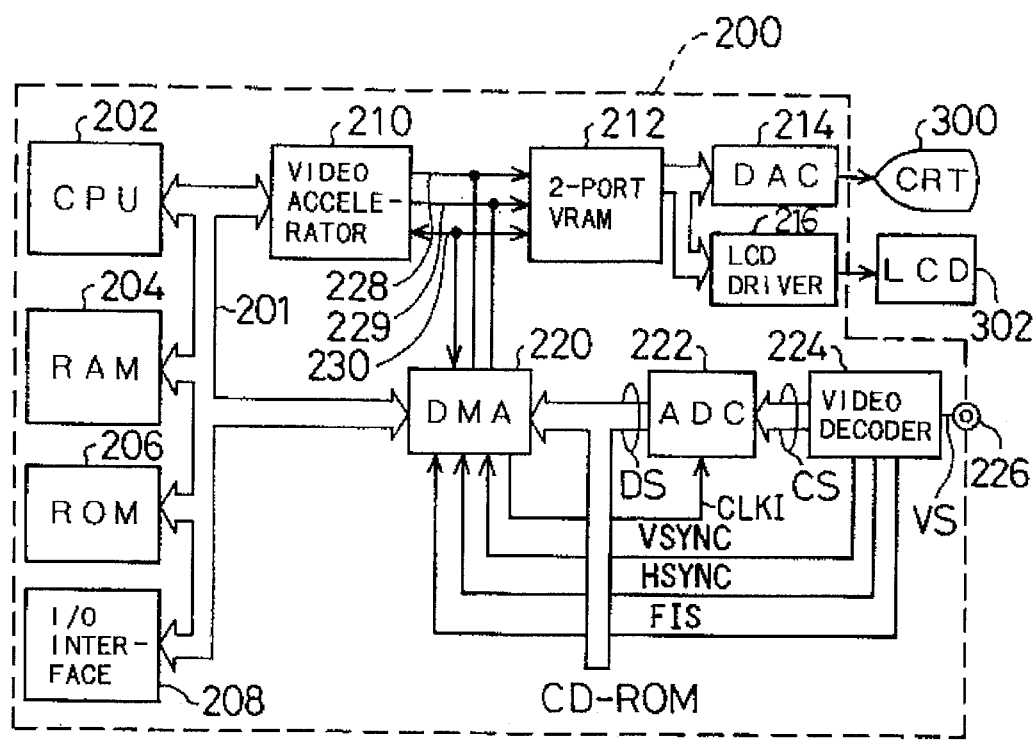
FIG. 16 is a block diagram showing a computer system as a second embodiment of the invention.

FIG. 16 is a perspective view of a computer system having a DMA controller according to a second embodiment of the present invention. The computer system comprises a personal computer 200, a color CRT 300, and a color LCD (Liquid Crystal Display) 302. The personal computer 200 includes CPU 202, RAM 204, R0M 206, an I/O interface 208, a video accelerator 210, a dual-port VRAM 212, a D-A converter (DAC) 214, a LCD driver 216, a DMA (Direct Memory Access) controller 220, an A-D converter 222, a video decoder 224, and a video input terminal 226. Some of the elements such as the CPU 202, the RAM 204, the R0M 206, the I/O interface 208, the video accelerator 210, and the DMA controller 220 are connected with each other by a CPU bus 201. Other elements such as the video accelerator 210, the dual-port VRAM 212, and the DMA controller 220 are connected with each other by a local bus including an address bus 228, a data bus 229, and a control bus 230.

The DMA controller 220, the A-D converter 222, the video decoder 224, and the video input terminal 226 are mounted on a single extension board, or a single extension card.

The video input terminal 226 receives a composite video signal VS given from a video player or a television tuner. The composite video signal VS is decoded by the video decoder 224 to be separated into color signals (or component video signals) including R, G, and B components, a vertical synchronizing signal VSYNC, a horizontal synchronizing signal HSYNC, and a field indication signal FIS.

The color signals CS are converted from analog to digital by the A-D converter 222, and the digital video data DS are supplied to the DMA controller 220. The DMA controller adjusts the number of bits of the digital video data, and transports the adjusted video data to the dual-port VRAM 212. The video data is read out from the dual-port VRAM 212 to be supplied to the color CRT 300 through the D-A converter 214, and to the liquid crystal display 302 through the LCD driver 216.

Figure 17:
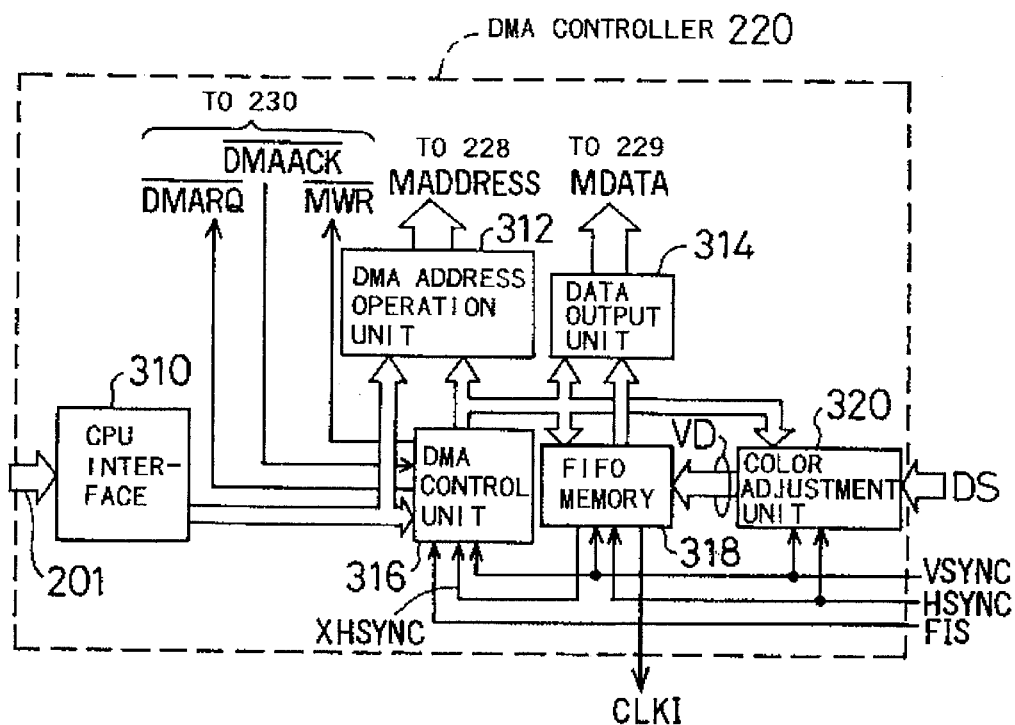
FIG. 17 is a block diagram illustrating the internal structure of a DMA controller 220.

FIG. 17 is a block diagram showing the internal structure of the DMA controller 220. The DMA controller 220 comprises a CPU interface 310, a DMA address operation unit 312, a data output unit 314, a DMA control unit 316, a FIFO memory unit 318, and a color adjustment unit 320.

The digital video signal DS, which is supplied to the color adjustment unit 320, is a 24-bit full color video signal including three 8-bit signals for R, G and B components. The color adjustment unit 320 converts the 24-bit digital video signal DS to a 16-bit signal (R:G:B=5:6:5) representing about 16,770,000 colors, an 8-bit signal (R:G:B=3:3:2) representing about 60,000 colors, a 4-bit signal representing 16 colors with a color palette, or a 3-bit signal representing 8 colors with a color palette. The 4-bit signal and the 3-bit signal are obtained through binarization operation according to a Dither method. A color palette is provided at the output side of the dual-port VRAM 212 for the 3-bit and 4-bit signals. The type of the color adjustment performed in the color adjustment unit 320 is specified by the CPU 202 according to an instruction by a user. This embodiment will be described for the case where the color adjustment unit 320 outputs the 24-bit full color video data VD without adjustment, which is hereinafter referred to as component video data.

The component video data VD are supplied from the color adjustment unit 320 to the FIFO memory unit 318. FIGS. 18(A) and 18(B) are block diagrams showing the internal structure of the FIFO memory unit 318. As shown in FIG. 18(A), the FIFO memory unit 318 comprises an FIFO control unit 321, two FIFO memories 322 and 324. As shown in FIG. 18(B), the FIFO control unit 321 comprises five PLL (Phase Locked Loop) circuits 325–328, and 510, and a waveform shaping unit 511. The first through third PLL circuits 325–327 generate clock signals CLKI, CLKO, and DCLK, whose frequencies are $N_{HO}$ times, ($N_{HO}$*HX) times, and $N_H$ times that of the horizontal synchronizing signal HSYNC, respectively. The fourth PLL circuit 328 generates a signal HINC whose frequency is $N_V$ times that of the vertical synchronizing signal VSYNC. The fifth PLL circuit 510 generates, as shown in FIG. 18(C), a signal HSYNC*HX whose frequency is HX times that of the horizontal synchronizing signal HSYNC. The waveform shaping unit 511 detects rise edges of the signal HSYNC*HX to generate a second horizontal synchronizing signal XHSYNC. The frequency of the second horizontal synchronizing signal XHSYNC is HX times that of the first horizontal synchronizing signal HSYNC. The values $N_{HO}$, ($N_{HO}$*HX), $N_H$, $N_V$, and HX are set in the PLL circuits by the CPU 202. The PLL circuits 325–328 executes image expansion and image reduction, and the functions of these circuits will be described later in detail.

The two FIFO memories 322 and 324 work as video data buffers for temporarily storing a predetermined amount of video data, and the FIFO control unit 321 works as a video data buffer control means in the present invention. The first PLL circuit 325 works as an input clock generation means, the second PLL circuit 326 as an output clock generation means, the fourth PLL circuit 328 as a line increment signal generation means, respectively. The second and fourth PLL circuits 326, 328 and the FIFO memory unit 318 as a whole work as a variable magnification means for expanding and reducing a video image in the vertical direction. The second and third PLL circuits 326 and 327 as a whole work as a variable magnification means for expanding and reducing a video image in the horizontal direction.

As shown in FIG. 17, the FIFO memory unit 318 outputs the video data on the data bus 229 through the data output unit 314. The DMA control unit 316 then obtains a right of use of the address bus 228, the data bus 229, and the control bus 230 from the video accelerator 210, and transfers the video data MDATA to the dual port VRAM 212.

Figure 19:
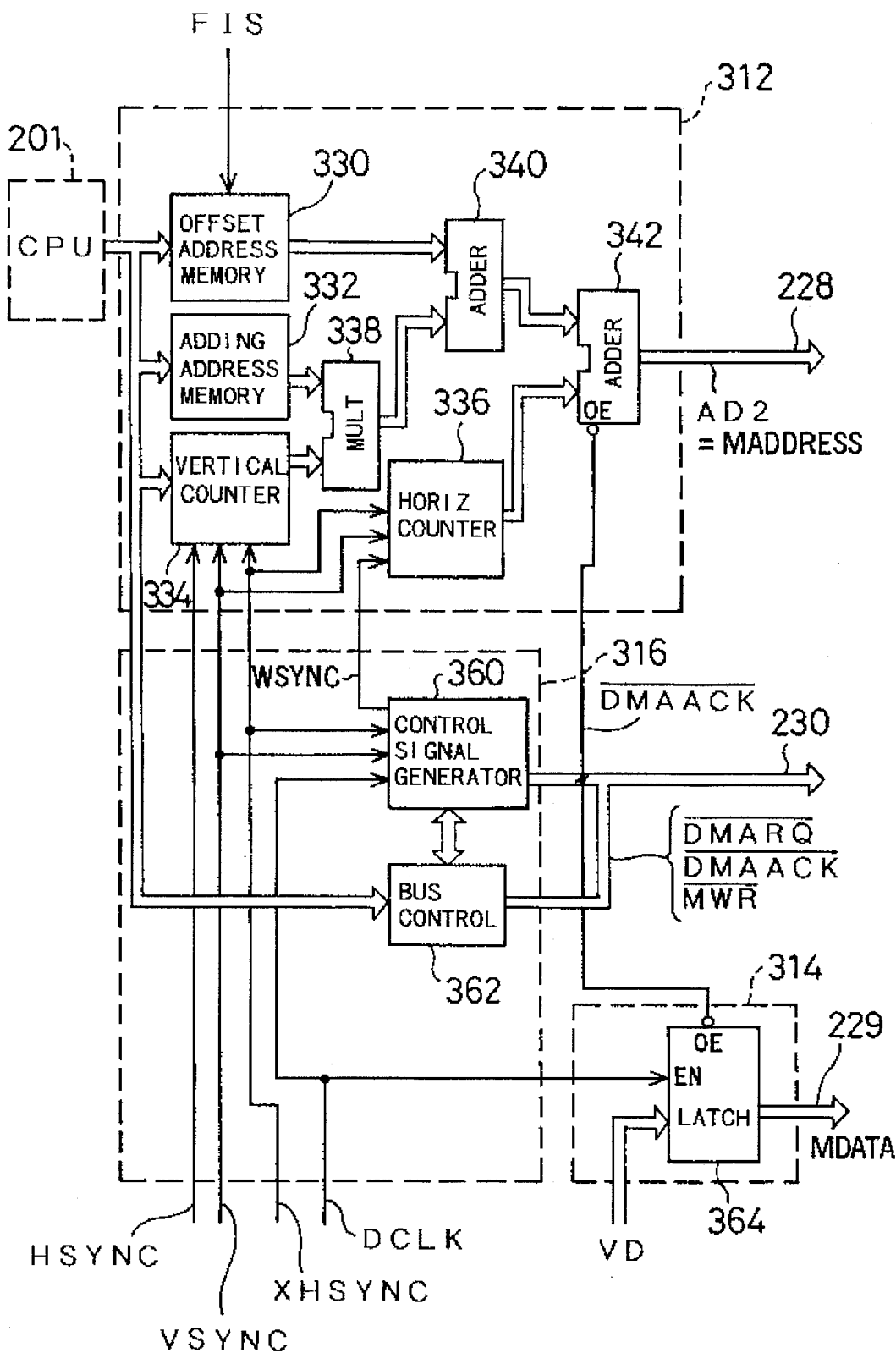
FIG. 19 is a block diagram showing the internal structure of a DMA address computation unit 312, a data output unit 314, and a DMA control unit 316.

FIG. 19 is a block diagram showing the internal structure of the DMA address operation unit 312, the data output unit 314, and the DMA control unit 316 in the DMA controller 220. The data output unit 314 comprises a latch 364 for storing the component video data VD. The data output unit 314 may further comprise a serial-to-parallel converter in order to simultaneously output the component video data VD for a plurality of pixels on the data bus 229.

The DMA address operation unit 312 comprises an offset address memory unit 330; an adding address memory unit 332; a vertical counter unit 334; a horizontal counter unit 336; a multiplier 338; and two adders 340 and 342. The multiplier 338 multiplies an adding address stored in the adding address memory unit 332 by a vertical count of the vertical counter unit 334. The first adder 340 adds the product in the multiplier 338 to an offset address (described later) stored in advance in the offset address memory unit 330. The second adder 342 adds the sum obtained by the first adder 340 to a horizontal count of the horizontal counter unit 336. An output AD2 from the second adder 342 becomes an address MADDRESS, which is given to the VRAM 212 in DMA transfer operation. The second adder 342 has a tri-state output.

H. Address Operation

FIG. 20 is a memory map of the dual port VRAM 212. One word in the VRAM 212 is constituted by 24 bits, which include R, G, and B components of the video data. One word corresponds to one pixel on a display screen.

FIG. 21 shows a relationship between the memory space of the VRAM 212 and the display screen. A horizontal range 80 of the VRAM 212 corresponds to 640 pixels, corresponding to 50h bytes, and a vertical range 81 corresponds to 199h (=409) scanning lines. In this embodiment, a moving picture area MPA, shaded in FIG. 21, in which the video data of a moving picture is written through DMA transfer, has a 2-byte horizontal width from the second byte and a 2-line vertical width from the second line in each plane. The moving picture area MPA in the memory space corresponds to an area specified by the operator on the screen of the color CRT 300 or the color LCD 302.

Figure 22:
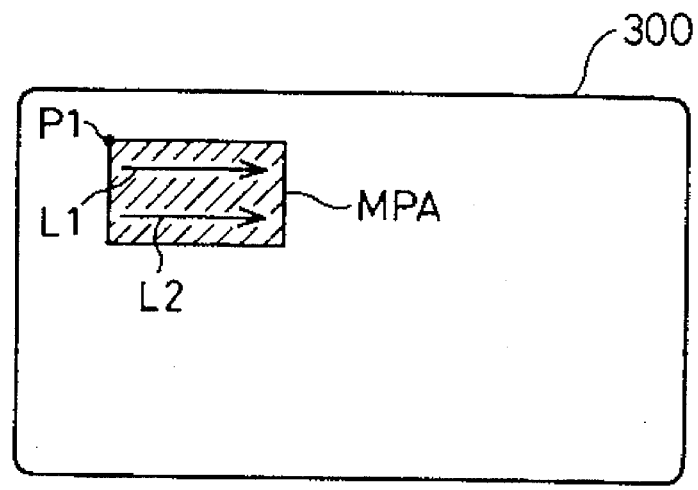
FIG. 22 is a plan view showing a moving picture area MPA in a display screen.

FIG. 22 is a plan view showing the moving picture area MPA specified on the display screen. The memory space shown in FIG. 21 uniquely corresponds to the display screen shown in FIG. 22. Explanation will be made for the case without the interlace scanning for convenience of simplicity.

Figure 23:
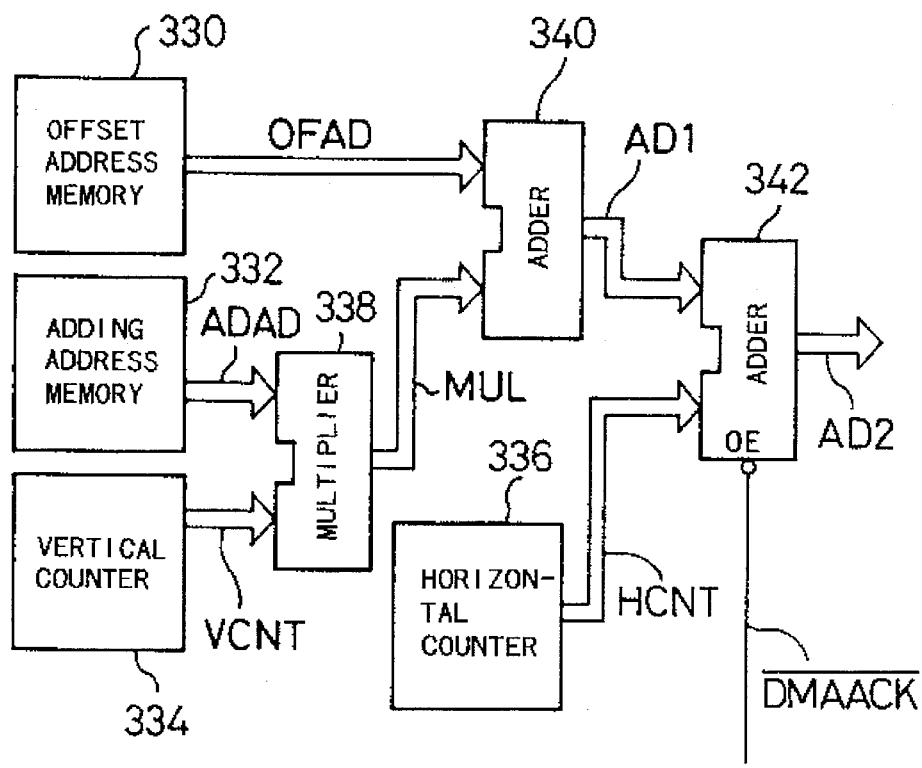
FIG. 23 is a block diagram showing details of the address operation unit 312 in the DMA controller 220.

FIG. 23 is an enlarged block diagram showing the structure of the address operation unit 312 in the DMA controller 220. An offset address OFAD stored in the offset address memory unit 330 represents an offset value (=51h) between the start address (=0000h) and the address (=0051h) at a writing start position of the moving picture area MPA shown in FIG. 21.

The writing start address (=0051h) is determined according to the position of a left upper point P1 of the moving picture area MPA specified on the screen by the operator (FIG. 22). When the operator specifies a moving picture area MPA on the screen, the CPU 202 calculates the writing start address (=0051h) corresponding to the left upper point P1, and writes the start address (=0051h) as the offset address OFAD in the offset address memory unit 330. The operator can set a moving picture area MPA of desirable dimensions at a desirable position on the screen, and the offset address OFAD is determined accordingly.

An adding address ADAD stored in the adding address memory unit 332 is equal to the number of pixels on one scanning line in the memory space, and is set at 50h in this embodiment.

An output MUL of the multiplier 338 and outputs AD1 and AD2 of the two adders 340 and 342 are respectively given as follows:

$$MUL = ADAD \times VCNT \quad (7)$$

$$AD1 = OFAD + MUL \quad (8)$$

$$AD2 = AD1 + HCNT \quad (9)$$

The output AD2 from the second adder 342 is given as follows from the above equations (7) through (9):

$$AD2 = (ADAD \times VCNT) + OFAD + HCNT \quad (10)$$

The vertical count VCNT indicates an ordinal number of scanning line in the moving picture area MPA. The horizontal count HCNT indicates a position from the left end point on each scanning line in the unit of dot, and corresponds to the horizontal address in the present invention. The output MUL of the multiplier 338 corresponds to the vertical address in the present invention.

The equation (10) gives the address AD2 for a position defined by the vertical count VCNT and the horizontal count HCNT. Since ADAD=50h and OFAD=51h in this embodiment, the equation (10) is rewritten as follows:

$$AD2 = (50h \times VCNT) + 51h + HCNT \quad (11)$$

As described later, the vertical count VCNT is increased by one every time when the DMA transfer of each scanning line is completed in the moving picture area MPA (FIG. 22), and the horizontal count HCNT is increased by one every time when the video data for one word is DMA-transferred on a scanning line. As a result, the component video data VD representing a video image within the moving picture area MPA are written in the VRAM 212 according to the address given by the equation (11).

I. Data Transfer Operation

FIGS. 24(a) through 24(k) are timing charts showing the overall DMA transfer operation. After the CPU 202 gives to the DMA control unit 316 an instruction to start the operation (FIG. 24(a)), the bus control unit 362 (FIG. 19) outputs a DMA request signal /DMARQ on the control bus 230. Then the video accelerator 210 gives a DMA acknowledge signal /DMAACK to the bus control unit 362, and the DMA controller 220 obtains the right of use of the local buses 228, 229, and 230.

After the instruction of DMA transfer is given from the CPU 202 to the DMA controller 220, the vertical counter unit 334 and the horizontal counter unit 336 are reset to zero responsive to a pulse of the vertical synchronizing signal VSYNC.

Figure 24:
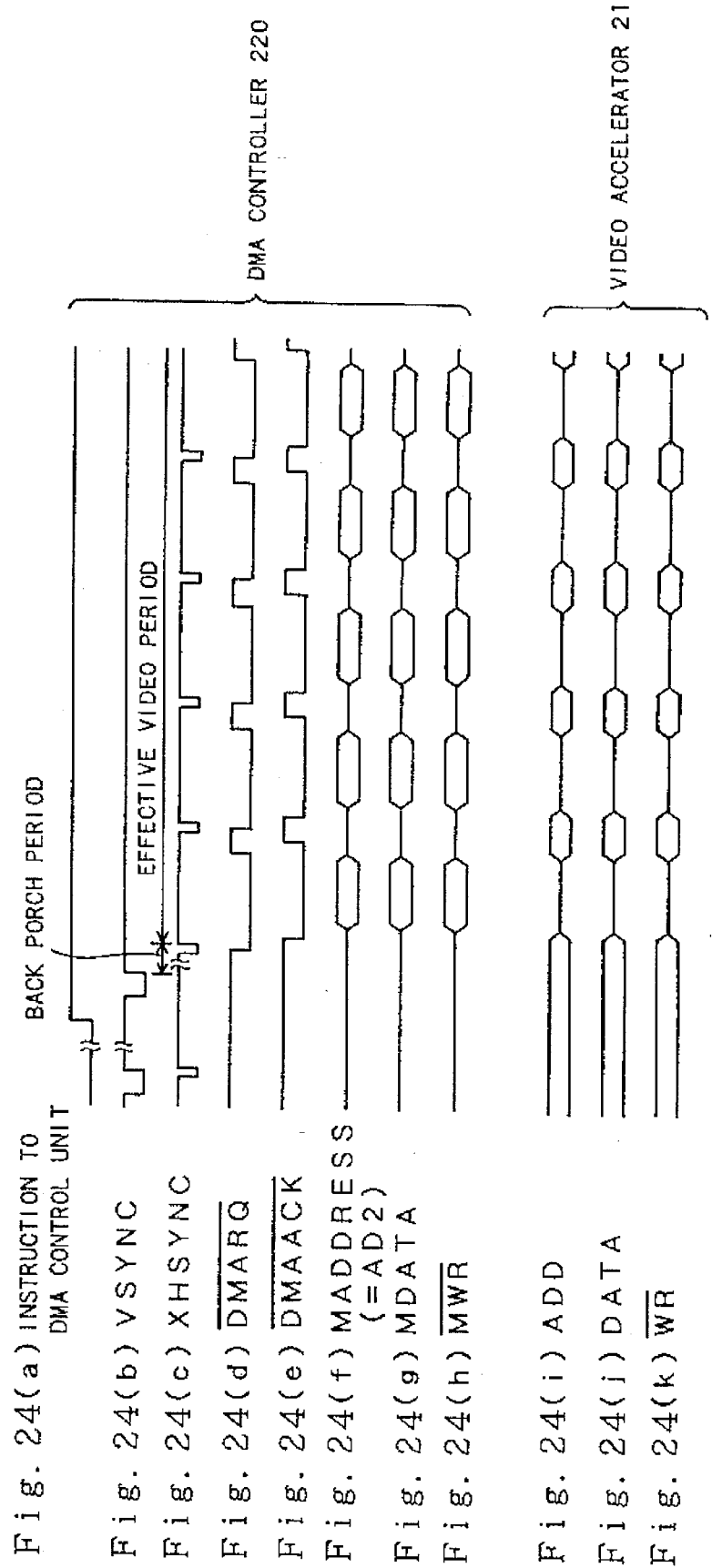
FIGS. 24(a) through 24(k) are timing charts showing general operations of DMA transfer.

A backporch period after the vertical synchronizing signal VSYNC is omitted in FIG. 24(c) for convenience of illustration. In an effective video period after the backporch period, the DMA controller 220 outputs the address MADDRESS (FIG. 24(f), the video data (FIG. 24(g)), and a write signal /MWR (FIG. 24(h)) while the DMA acknowledge signal /DMAACK (FIG. 24(e)) is kept at a low level. When the DMA acknowledge signal /DMAACK goes up to a high level, on the other hand, the video accelerator 210 uses the local buses (FIGS. 24(i)–(k)).

FIGS. 25(a) through 25(g) are timing charts showing detailed operation of the DMA transfer. In the effective video period, a pulse of the second horizontal synchronizing signal XHSYNC enables the horizontal counter unit 336, and makes the vertical counter unit 334 to start counting-up operation. The internal structure of the vertical counter unit 334 will be described below in order to show the function thereof, FIG. 26 is a block diagram showing the internal structure of the vertical counter unit 26 and pertinent parts of the FIFO control unit 321. The PLL circuit 327 in the FIFO control unit 321 generates a dot click signal DCLK whose frequency is $N_H$ times that of the horizontal synchronizing signal HSYNC. The PLL circuit 328 generate a line increment signal HINC whose frequency is $N_V$ times that of the vertical synchronizing signal VSYNC. The case where the line increment signal HINC has the same frequency as the second horizontal synchronizing signal XHSYNC will be explained first below. In this case, the video image is not reduced in the vertical direction.

The vertical counter unit 334 includes a back porch memory 402, a comparator 404, a back porch counter 406, a vertical counter 408, and a latch 410. The back porch memory 402 stores back porch number BP given from the CPU 202 via the CPU bus. The back porch number BP denotes the number of pulses of the horizontal synchronizing signal HSYNC in the back porch period. The first horizontal synchronizing signal HSYNC is supplied to the back porch counter 406, and the second horizontal synchronizing signal XHSYNC is supplied to the clock input terminal of the latch 410. The line increment signal HINC is supplied to a clock input terminal of the vertical counter 408. The vertical synchronizing signal VSYNC is supplied to reset terminals of the back porch counter 406 and the vertical counter 408, respectively. The comparator 404 compares the back porch number BP stored in the back porch memory 402 with the count BPC in the back porch counter 406.

An output CMP of the comparator 404 becomes at H level when BP is equal to BPC, and at L level when BP is not equal to BPC. The back porch counter 406 is enabled when the output CMP of the comparator 404 is at L level, whereas the vertical counter 408 is enabled when the output CMP is at H level.

The back porch counter 406 and the vertical counter 408 are reset to zero in response to a pulse of the vertical synchronizing signal VSYNC. Since the output CMP of the comparator 404 is at L level at that moment, the back porch counter 406 is enabled to count the number of pulses of the horizontal synchronizing signal HSYNC, while the vertical counter 408 is not operating. When the back porch counter 406 counts the number of pulses of the horizontal synchronizing signal HSYNC up to the back porch number BP, BPC becomes equal to BP. As a result, the output CMP of the comparator 404 goes up to H level, whereby the back porch counter 406 stops the counting and the vertical counter 408 starts counting up. The count CNT of the vertical counter 408 is held by the latch 410 at a rise edge of the second horizontal synchronizing signal XHSYNC, to be output as the vertical count VCNT. The vertical count VCNT indicates the ordinal number of scanning lines in the display screen. Vertical image reduction is not executed if the second horizontal synchronizing signal XHSYNC has the same frequency as the line increment signal HINC, and in this case the vertical count VCNT is equal to the number of pulses of the second horizontal synchronizing signal XHSYNC.

The vertical counter 408 and the latch 410 as a whole work as a means for generating a scanning line number.

The control signal generator 360 in the DMA control unit 316 (FIG. 19) receives a dot clock signal DCLK which is generated by the PLL circuit 327 in the FIFO control unit 321 (FIG. 26). The control signal generator 360 controls the horizontal counter unit 336 in synchronism with the dot clock signal DCLK.

Figure 25:
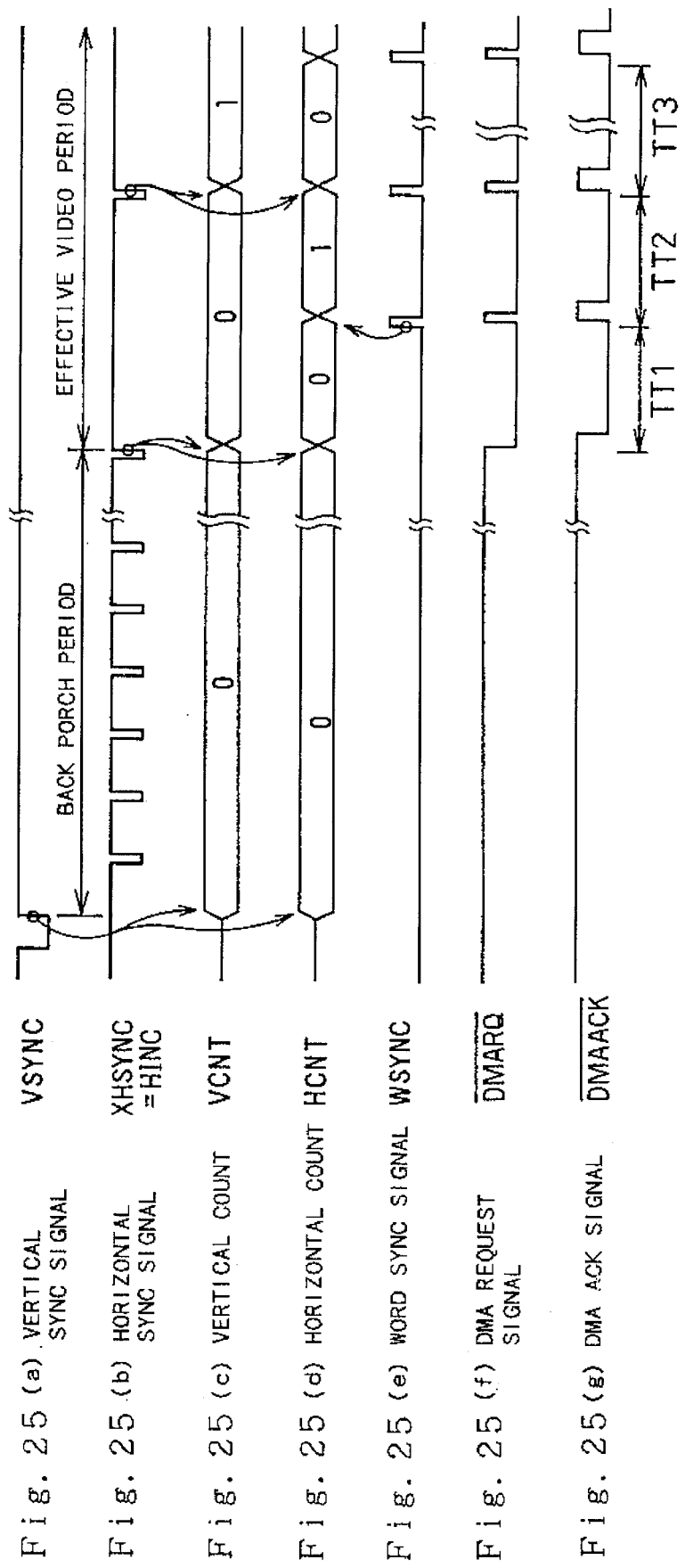
FIGS. 25(a) through 25(g) are timing charts showing details of the DMA transfer.
Figure 26:
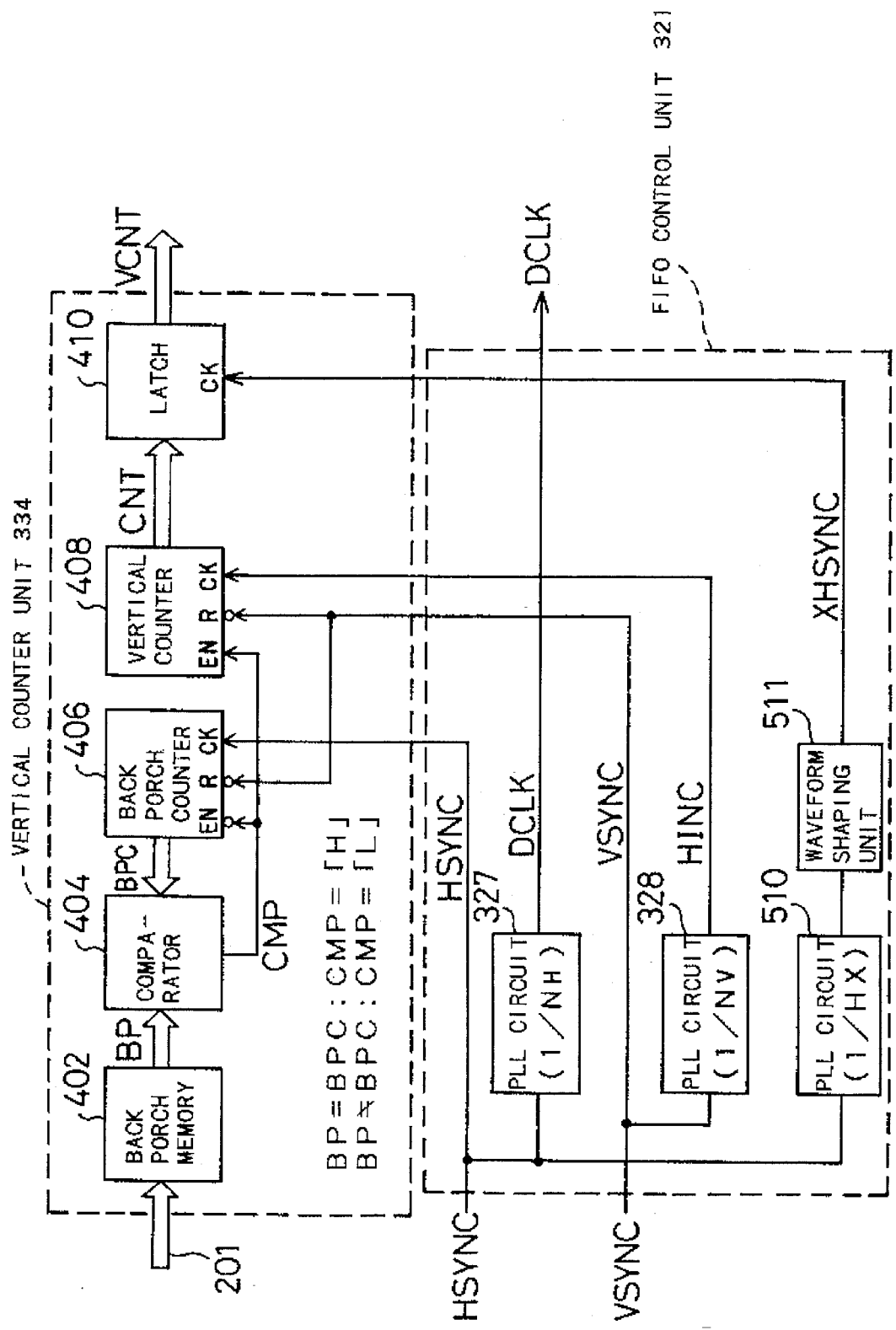
FIG. 26 is a block diagram showing the internal structure of a vertical counter unit 334 and a FIFO control unit 321.

When the video data VD for one pixel (=one word=24 bits) is transferred in the term TT1 of FIG. 25(g), the control signal generator 360 outputs a word synchronizing signal WSYNC to the horizontal counter unit 336. Actually, the control signal generator 360 outputs one pulse of the word synchronizing signal WSYNC every time when receiving one pulse of the dot clock signal DCLK. The horizontal counter unit 336 counts up the horizontal count HCNT by one in response to the word synchronizing signal WSYNC. Since VCNT=0h and HCNT=0h in the equation (11) in the term TT1, the address AD2 becomes equal to 0051h. This address AD2 corresponds to the left upper position of the moving picture area MPA shown in FIG. 21.

In the next term TT2, the address AD2 becomes equal to A0052h because VCNT=0h and HCNT=1h. This address AD2 corresponds to the right upper position of the moving picture area MPA shown in FIG. 21.

Thus the video data transfer is completed for a first scanning line L1 in the moving picture area MPA shown in FIG. 21 in the terms TT1 and TT2. At the end of the term TT2, a pulse of the second horizontal synchronizing signal XHSYNC, indicating completion of the first scanning line and start of a second scanning line, is given to the DMA control unit 316. As described before, the frequency of the second horizontal synchronizing signal XHSYNC is HX times that of the first horizontal synchronizing signal HSYNC, where HX is an integer.

The vertical counter unit 334 increases the vertical count VCNT by one to make VCNT=1h in response to a pulse of the second horizontal synchronizing signal XHSYNC indicating the start of a next term TT3, whereas the horizontal count HCNT in the horizontal counter unit 336 is reset to zero. The video data MDATA are subsequently transferred to the VRAM 212 at the addresses 00A1h and 00A2h in the similar manner.

When the data transfer is completed for all the scanning lines L1 and L2 in the moving picture area MPA (FIG. 22), the vertical counter unit 334 and the horizontal counter unit 336 are reset to zero in response to a pulse of the vertical synchronizing signal VSYNC. As a result, the DMA controller 220 is initialized to the stand-by state until receiving video data of the next field.

As described above, both the vertical count VCNT and the horizontal count HCNT are reset to zero every time when a pulse of the vertical synchronizing signal VSYNC is supplied, in the case where a video image is not reduced in the vertical direction. The vertical count VCNT is increased by one while the horizontal count HCNT is reset to zero every time when a pulse of the second horizontal synchronizing signal XHSYNC is supplied. If a video image is to be reduced in the vertical direction, the vertical count VCNT is increased in response to a combination of the second horizontal synchronizing signal XHSYNC and the line increment signal HINC. The latter case will be described later in detail.

As describe above, the vertical count VCNT is increased in response to the second horizontal synchronizing signal XHSYNC and the line increment signal HINC, and the horizontal count HCNT is increased in response to the word synchronizing signal WSTNC. Since the address of the VRAM 212 is given by the equation (11), the address is successively updated in synchronism with the second horizontal synchronizing signal XHSYNC, the line increment signal HINC, and the word synchronizing signal WSYNC. Since this address operation can be executed at a high speed, the video data MDATA representing a video image within the moving picture area MPA will be transferred to the VRAM 212 according to the address at about every 1/60 second.

The explanation of the data transfer with interlace scanning is omitted for the second embodiment because it is similar to that of the first embodiment.

Since the address operation unit 312 is constituted by one multiplier and a plurality of address, it can compute addresses for DMA transfer at a high speed. The computer system of the second embodiment has another advantage of executing the DMA transfer without another video memory other than the VRAM 212.

J. Image Expansion and Image Reduction

In the computer system of the second embodiment, the FIFO memory unit 318 (FIG. 18(A)) has a function of expanding and reducing video images. FIGS. 27(A) through 27(C) show an expansion process in a vertical direction: FIGS. 27(A) and 27(B) show waveforms of input video data $VD_I$ and output video data $VD_O$; and FIG. 27(C) schematically illustrates the function of the two FIFO memories. The video data are shown in the form of original analog video signals VS for the convenience of illustration.

As shown in FIG. 27(C), input terminals and output terminals of the two FIFO memories 322 and 324 are alternately switched in a complementary manner by virtual toggle switches 323a and 323b. These virtual toggle switches 323a and 323b perform functions equivalent to complementary, alternate switching of inputs and outputs of the two FIFO memories 322 and 324 by means of an input enable signal RE and an output enable signal OE given from the FIFO control unit 321. An input clock signal CLKI and an output clock signal CLKO are commonly given to the two FIFO memories 322 and 324. A frequently $f_{CLKI}$ Of the input clock signal CLKI is $N_{HO}$ times that of the horizontal synchronizing signal HSYNC as can be seen from the circuit shown in FIG. 18(B). When a video signal VS given to the video input terminal 226 (FIG. 16) is an NTSC signal, $f_{CLKI}$ is a constant frequency of approximately 6 MHz. A frequency $f_{CLKO}$ of the output clock signal CLKO is HX times $f_{CLKI}$, where HX is an integer (FIG. 18(B)). A set value ($N_{HO}$*HX) in the PLL circuit 326 for generating the output clock signal CLKO is equal to HX times a set value $N_{HO}$ in the PLL circuit 325 for generating the input clock signal CLKI. In this embodiment, HX is equal to three.

During a first period TT11 and a third period TT13 in FIGS. 27(A) and 27(B), the input video data $VS_I$ are written into the first FIFO memory 322 while the output video data $VD_O$ are read out of the second FIFO memory 324. During a second time period TT12, on the other hand, the input video data $VD_I$ are written into the second FIFO memory 324 while the output video data $VD_O$ are read out of the first FIFO memory 322. As a result, video data for a first scanning line L1 are written into the first FIFO memory 322 during the first period TT11, and video data for a second scanning line L2 are written into the second FIFO memory 324 during the second period TT12. Since the frequency $f_{CLKO}$ Of the output clock signal CLKO is set equal to three times the frequency $f_{CLKI}$ Of the input clock signal CLKI in this embodiment, the video data for the first scanning line L1 are read out three times from the first FIFO memory 322 during the second time period TT12 as shown in FIG. 27(B).

FIGS. 28(A) through 28(C) show a process of image expansion and image reduction in the vertical direction: FIGS. 28(A) and 28(B) respectively show the input video data $VD_I$ and the output video data $VD_O$. Each scanning line in the input video data $VD_I$ is repeated HX(=3) times in the output video data $VD_O$. This results in expansion of a video image by HX(=3) times in the vertical direction. In FIG. 28(B), for example, symbols 'L1a', 'L1b', and 'L1c' denote the repeated lines of the original first scanning line L1. A video image will be expanded by an integral multiple in the vertical direction in this manner by setting the frequency $f_{CLKO}$ Of the output clock signal CLKO equal to the integral multiple of the frequency $f_{CLKI}$ Of the input clock signal CLKI.

Image reduction in the vertical direction is attained by the PLL circuit 328 in the FIFO control unit 321 and the vertical counter 408 and the latch 410 in the vertical counter unit 334 shown in FIG. 26. FIGS. 29(a) through 29(d) are timing charts showing the image reduction operation in the vertical direction. The line increment signal HINC (FIG. 29(a)) generated in the PLL circuit 328 has a frequency $f_{HINC}$, which is $N_V$ times a frequency $f_{VSYNC}$ Of the vertical synchronizing signal VSYNC. The second horizontal synchronizing signal XHSYNC (FIG. 29(c)) has a frequency $f_{XHSYNC}$, which is ($N_{VO}$*HX) times the frequency $f_{VSYNC}$. Here $N_{VO}$ represents a constant value showing the number of scanning lines in one field in the original analog video signal VS (hereinafter referred to as total picture line number). For example, $N_{VO}$ is equal to 262.5 when the video signal VS is an NTSC signal. As shown in FIG. 30(A) and 30(B), a set value $N_V$ in the PLL circuit 328 is given by:

$$N_V = N_{VM} * HX * N_{VO}/(HX * N_{VL})$$
$$= N_{VM} * N_{VO}/N_{VL}$$

where $N_{VO}$ denotes the total picture line number of a video image represented by the analog video signal VS, $N_{VL}$ denotes the effective number of scanning lines of the video image, and $N_{VM}$ denotes the number of scanning lines of the video image displayed on a display device. $N_{VM}$ is no more than $HX*N_{VL}$.

For example, when $N_{VO}$=262.5, $N_{VL}$=240, and $N_{VM}$=480 are substituted in the above equation, the set value $N_V$ becomes equal to 525.

The vertical counter 408 (FIG. 26) increases a count CNT (FIG. 15(b)) at a rise edge of the line increment signal HINC whereas the latch 410 latches the count CNT of the vertical counter 408 at a rise edge of the second horizontal synchronizing signal XHSYNC and outputs it as the vertical count VCNT (FIG. 29(d)).

In the example of FIGS. 29(a) through 29(d), the ratio of the frequency $f_{HINC}$ to the frequency $f_{XHSYNC}$ is set equal to ⅔. The vertical count VCNT (FIG. 29(d)) goes like 0, 1, 2, 2, 3, 4, 4, ..., where the same value at every second position is repeated. Since the vertical count VCNT shows a vertical address in the VRAM 212, video data for a third scanning line L1c and video data for a fourth scanning line L2a are written at the third vertical address VCNT=2 in the VRAM 212. Therefore the video data for the scanning line L1c first written at the third vertical address VCNT=2 are replaced by the video data for the next scanning line L2a. Repetition of such procedures results in skipping video data for the scanning lines at the ordinal numbers which are expressed by integral multiples of three, thus implementing image reduction in the vertical direction.

FIGS. 29(B) and 28(C) show the image reduction in the vertical direction according to the process shown in FIGS. 29(a) through 29(d). The output video data $VD_O$ shown in FIG. 29(B) includes video data for nine scanning lines L1a through L3c. In the image reduction process, video data for the third scanning line L1c are replaced by those for the fourth scanning line L2a, and video data for the sixth scanning line L2c are replaced by those for the seventh scanning line L3a. This results in the reduction of a video image by $N_V/(N_{VO}*HX)$ times in the vertical direction. Since the video data are previously expanded by HX times by means of the two FIFO memories 322 and 324, a total vertical magnification $M_V$ is given by:

$$M_V = N_V/N_{VO} \qquad (12)$$

A horizontal magnification $M_H$ representing image expansion/reduction in the horizontal direction is equal to a ratio of $f_{DCLK}/f_{CLKO}$, where $f_{DCLK}$ denotes a frequency of the dot clock signal DCLK (FIG. 26) which is used in writing video data into the VRAM 212, and $f_{CLKO}$ denotes a frequency of the output clock signal CLKO (FIG. 27(c)) which is used in reading out video data from the FIFO memories 322 and 324. The frequency $f_{CLKO}$ is HX times the frequency $f_{CLKI}$ as described above along with FIGS. 27(a) through 27(c), and the frequency $f_{CLKI}$ is a constant value according to frequency characteristics of the composite video signal VS. The horizontal magnification $M_H$ is therefore given by:

$$M_H = f_{DCLK}/f_{CLKO} = f_{DCLK}/(HX*f_{CLKI}) \qquad (13)$$

As can be understood from FIG. 18(B), the frequency $f_{CLKI}$ is $N_{HO}$ times the frequency $f_{HSYNC}$ of the horizontal synchronizing signal HSYNC, where $f_{HSYNC}$ and $N_{HO}$ are constants. Further, the frequency $f_{DCLK}$ Of the dot clock signal DCLK is $N_H$ times $f_{HSYNC}$. The equation (13) is thus rewritten as:

$$\begin{aligned} M_H &= f_{DCLK}/(HX*f_{CLKI}) \qquad (14)\\ &= f_{HSYNC}*N_H/(HX*f_{HSYNC}*N_{HO})\\ &= N_H/(HX*N_{HO}) \end{aligned}$$

In the equation (12) showing the vertical magnification $M_V$ and the equation (14) showing the horizontal magnification $M_H$, the three values HX, $N_V$, and $N_H$ are set in the FIFO control unit 321 by the CPU 202. The three values HX, $N_V$, and $N_H$ are determined, for examples, as follows:

$$HX = RND(My) \qquad (15a)$$

$$N_V = N_{VO}*M_V \qquad (15b)$$

$$N_H = N_{HO}*M_H*HX \qquad (15c)$$

where an operator RND represents raising fractions under a decimal point of a numeral in the brackets to a whole number.

Since the equations (15b) and (15c) hold for any integer HX, the value of the integer HX can be determined according to other conditions instead of the equation (15a).

FIG. 30(A) shows an original video image OR represented by an original composite video signal VS, and FIG. 30(B) shows a VRAM space where a video image MR after expansion or reduction is stored. In this embodiment, the maximum pixel number HLMAX in the horizontal direction is set equal to 780, the effective pixel number HDMAX to 640, the maximum line number $2N_{VO}$ in the vertical direction to 525, and the effective line number $2N_{VL}$ to 480, respectively. The video image MR in the VRAM space is directly displayed on the color CRT 300 or the color liquid crystal display 302. The vertical magnification $M_V$ and the horizontal magnification $M_H$ are thereby equal to a ratio of the size of a display window for a moving picture on a display device to the size of the original video image OR. The CPU 202 calculates the vertical magnification $M_V$ and the horizontal magnification $M_H$ from the size of the display window, and determines the three values HX, $N_V$, and $N_H$ according to the above equations (15a) through (15c) to set the values in the FIFO control unit 321.

In the second embodiment described above, a video image can be expanded or reduced by an arbitrary magnification during DMA transfer operation of the video data to the VRAM 212. A display position of the video image can also be set arbitrarily by the address operation unit 312. A moving picture can thereby be displayed by an arbitrary magnification at any desirable position on a display device.

K. Modification of Second Embodiment

Any RAM having two or more ports can be used as a video memory in the second embodiment. Even a single-port RAM can be used as a video memory when it realizes a function equivalent to a dual-port RAM through switching of inputs and outputs of the single port.

The present invention is applicable to data transfer of other video signals such as YUV signals as well as RGB color signals.

The present invention is also applicable to data transfer of digital video data which is obtained by decompressing compressed image data. In this case, the digital video data supplied from an image decompression unit are input into an input port for digital video data DS (shown as 'CD-ROM' in FIG. 16) between the DMA controller 220 and the A-D converter 222.

A circuit for calculating the address AD2 given by the equation (10) may have another structure other than that described in the above embodiment. For example, replacement of the adder in the DMA controller 220 with a subtracter or changing the order of additions will attain the similar effects.

In another possible structure, the multiplier 338 shown in FIG. 19 can be replaced by an adder and an up-counter, where the adding address ADAD stored in the adding address memory 332 is added by the number of times corresponding to the number of the vertical count VCNT of the vertical counter unit 334.

Figure 31:
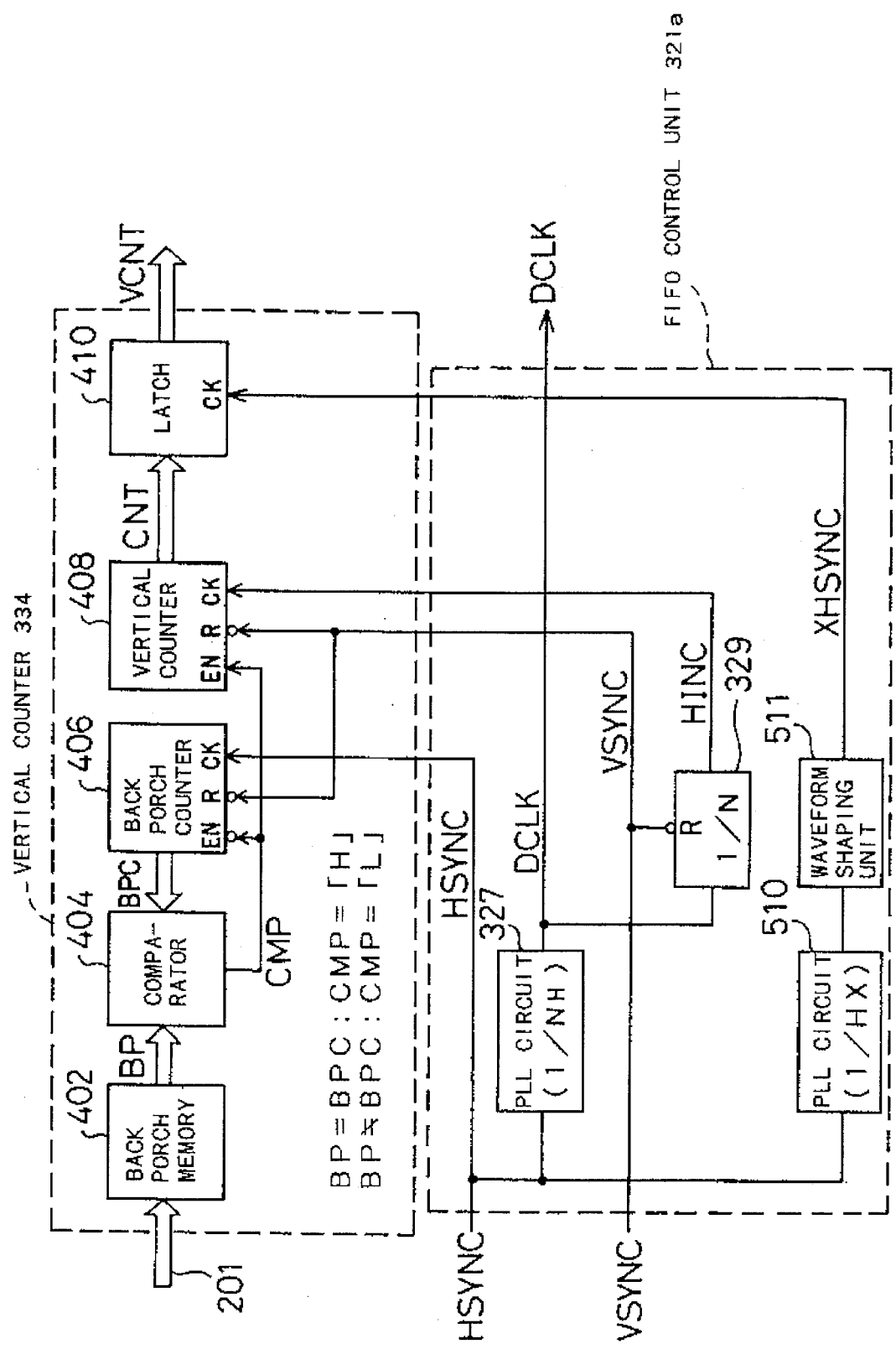
FIG. 31 is a block diagram showing a circuit structure where the second PLL circuit 328 is replaced by a divide-by-N counter.

The PLL circuit 328 of FIG. 26 can be replaced by a divide-by-N counter 329 as shown in FIG. 31. The divide-by-N counter 329 is reset by the vertical synchronizing signal VSYNC and subsequently divides the frequency of the dot clock signal DCLK by N to generate the line increment signal HINC. The device-by-N counter 329 effectively reduces jitter of the line increment signal HINC compared with that generated by the PLL circuit 328.

Figure 32A:
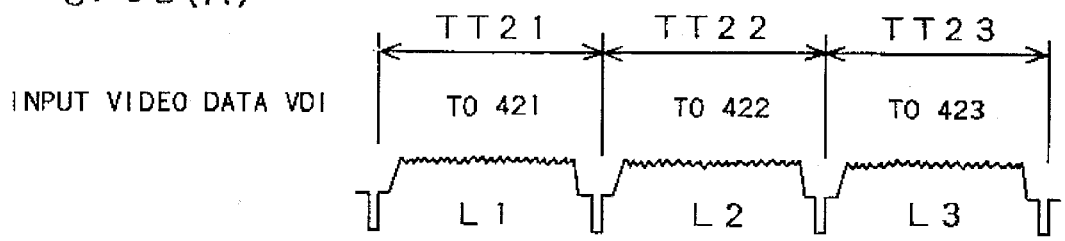
FIGS. 32(A) through 32(C) show a process of interpolation and expansion in the vertical direction with three FIFO memories.
Figure 32B:
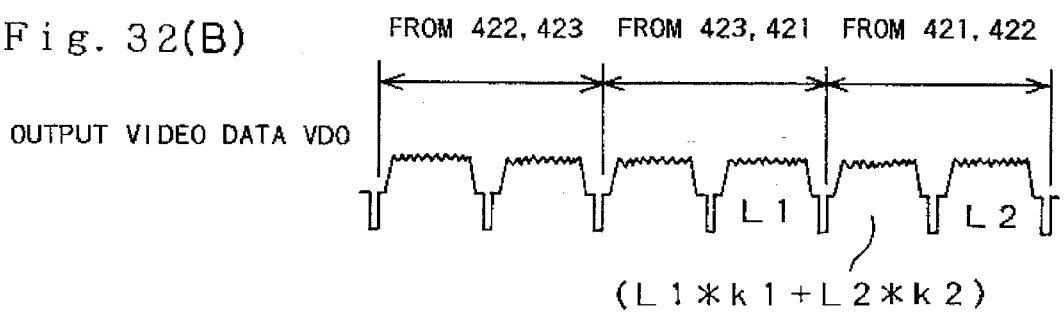
Figure 32C:
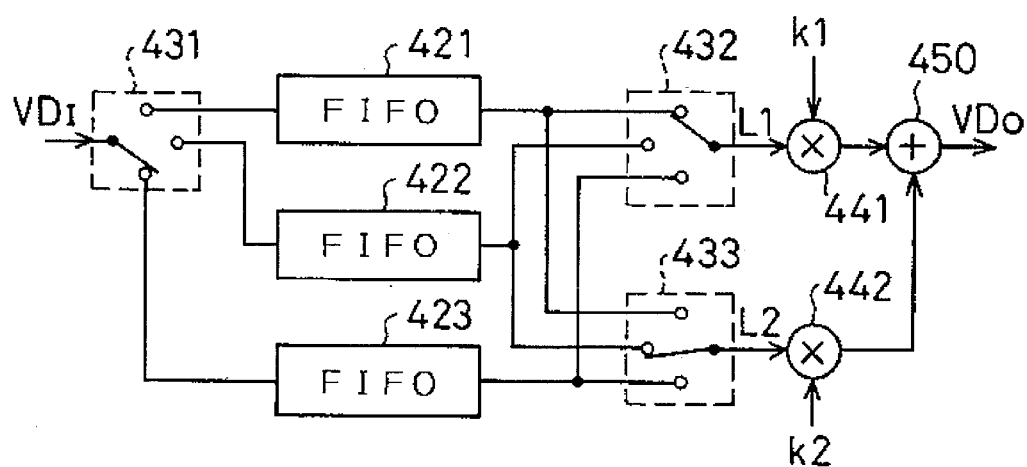

FIGS. 32(a) through 32(c), which correspond to FIGS. 26(a) through 26(c), show the structure and operation of a circuit to execute interpolation between scanning lines as well as image expansion in the vertical direction. As shown in FIG. 32(c), this circuit includes three FIFO memories 421, 422, and 423, three virtual switches 431, 432, and 433, two multipliers 441 and 442, and an adder 450. As shown in FIGS. 32(a), video data for each scanning line are written into one FIFO memory during each of first through third periods TT21, TT22, and TT23, while, as shown in FIG. 32(b), video data are read out of the other two FIFO memories during each period. In other words, one of the FIFO memories is selected for input in a predetermined order whereas the other FIFO memories are selected for output in each period. FIG. 32(c) shows the connection states of the switches in the first half of the third period TT23. During this period, video data for a first scanning line L1 read out of the first FIFO memory 421 are multiplied by k1 by the first multiplier 441, and video data for a second scanning line L2 read out of the second FIFO memory 422 are multiplied by k2 by the second multiplier 442, and outputs of the two multipliers 441 and 442 are added by the adder 450. Output video data $VD_O$ generated by the adder 450 during the first half of the third time period TT23 is equal to (L1*k1+L2*k2) accordingly, as shown in FIG. 32(b). When both the coefficients k1 and k2 are equal to 0.5, the output video data $VD_O$ generated in the first half of the third time period TT23 is a simple average of the video data for the two scanning lines L1 and L2. The output video data $VD_O$ will become a weighted mean of the two scanning lines by setting k1 and k2 to appropriate values other than zero. In the latter half of the third time period TT23, the video data for the second scanning line L2 itself is output as the output video data $VD_O$.

Another FIFO memory unit functioning in the same manner as the FIFO memory unit 318 can be disposed between the A-D converter 222 and the color adjustment unit 320 to attain similar effects regarding image expansion and interpolation. In such a case, the FIFO memory unit 318 of FIG. 18(A) will not expand video data VD in the vertical direction, but works as a circuit for adjusting the timing of data transfer.

In the present invention, the term "image expansion in the vertical direction" means not only simple expansion as shown in FIGS. 27(a) through 27(c) but also the expansion with interpolation as shown in FIGS. 32(a) through 32(c).

Another video data buffers, such as RAMs, can be used in place of a plurality of FIFO memories to construct a circuit having the image magnification function equivalent to the above FIFO memory unit. In general, the function of the FIFO memory unit described above can be realized by a plurality of video data buffers and a buffer control circuit, where the plurality of video data buffers are switched in a predetermined order by the buffer control circuit.

The function of the PLL circuit 325 shown in FIG. 18(B) can be realized by another circuit which receives the signal CLKO from the PLL circuit 326 to divide the frequency of the signal CLKO by an integer $N_{H0}$ and which is reset by the horizontal synchronizing signal HSYNC. The plurality of PLL circuits shown in FIG. 18(B) can be thus replaced by divided-by-N counters or the like.

In another modified structure, the color adjustment unit 320 shown in FIG. 17 may receive a digital video signal DS in the form of a YUV signal, and perform hue conversion to generate component video data VD in the form of an RGB signal.

L. Third Embodiment

Figure 33:
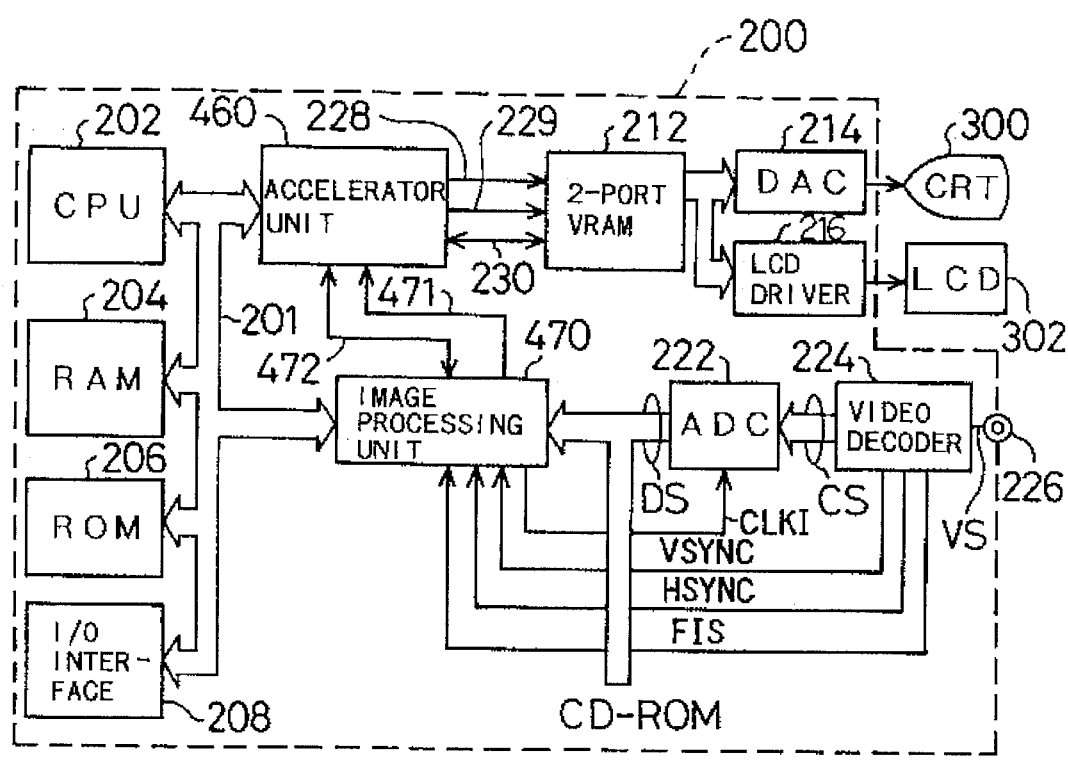
FIG. 33 is a block diagram illustrating a computer system as a third embodiment of the invention.

FIG. 33 is a block diagram showing a computer system as a third embodiment of the present invention. The computer system has a similar structure to that shown in FIG. 16, except an accelerator unit 460 and an image processing unit 470, which are replaced for the video accelerator 210 and the DMA controller 220 of FIG. 16, respectively. The accelerator unit 460 and the image processing unit 470 are connected to each other via a data bus 471 and a control bus 472.

Figure 34:
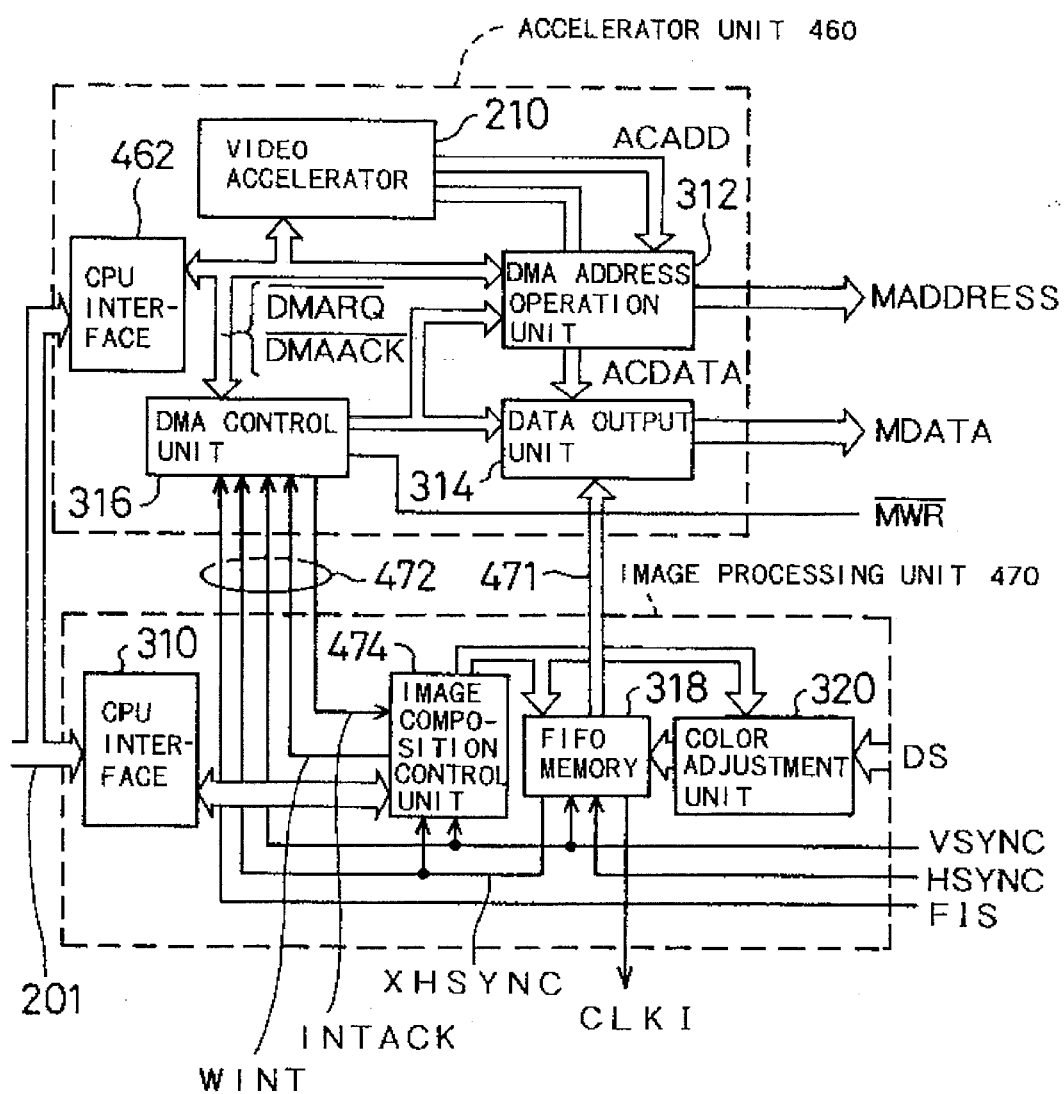
FIG. 34 is a block diagram illustrating the internal structure of a accelerator unit 460 and an image processing unit 470 in the third embodiment.
Figure 35:
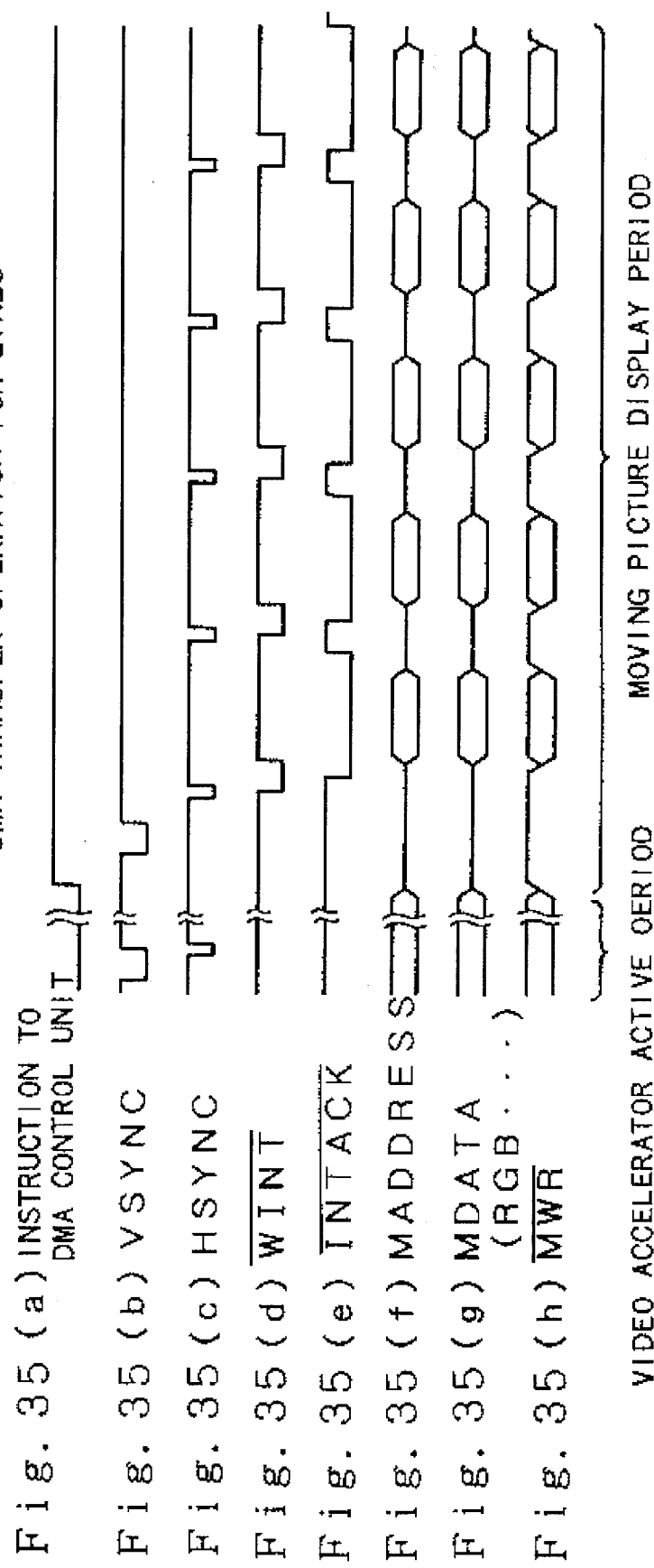
FIGS. 35(a) through 35(h) are timing charts showing DMA transfer operation with respect to scanning lines in the third embodiment.
Figure 36:
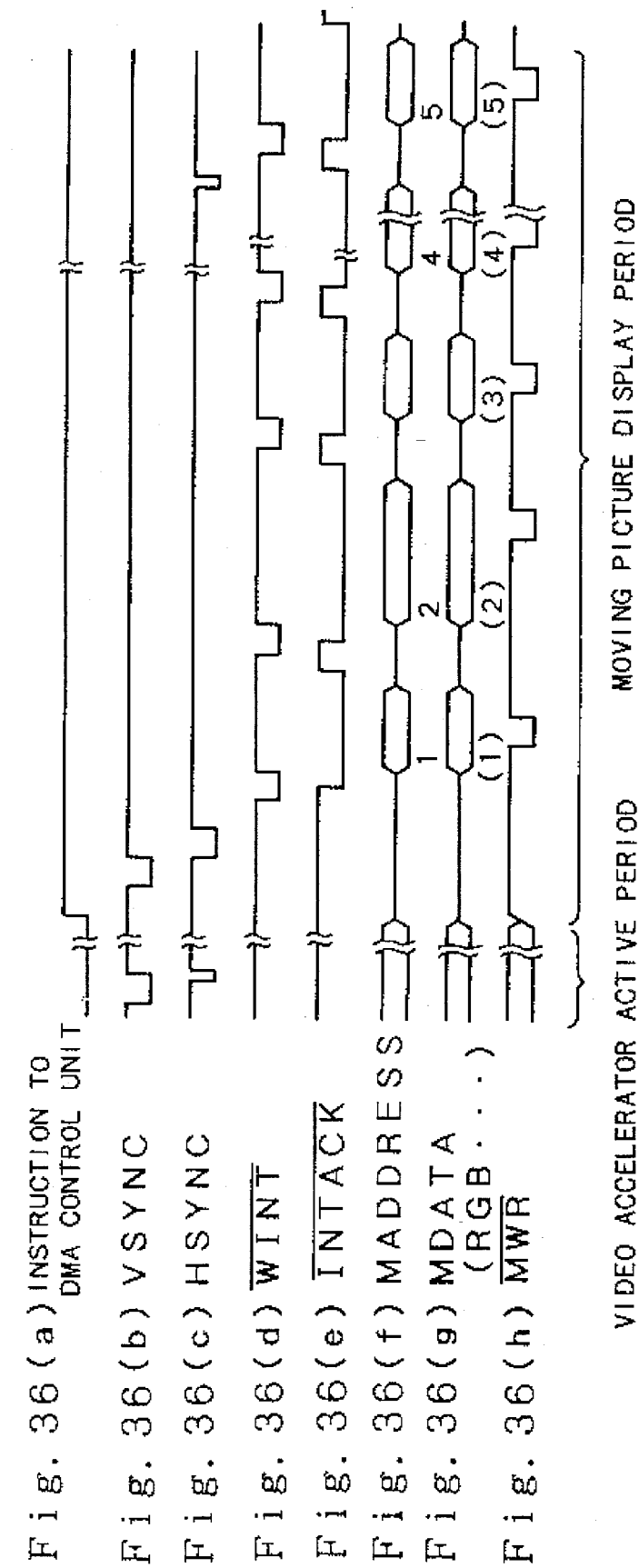
FIGS. 36(a) through 36(h) are timing charts showing DMA transfer operation with respect to words in the third embodiment.

FIG. 34 is a block diagram showing the internal structure of the accelerator unit 460 and the image processing unit 470. The accelerator unit 460 includes the video accelerator 210 and a CPU interface 462 as well as the DMA address operation unit 312, the data output unit 314, and the DMA control unit 316, which are the same circuits as those shown in FIG. 17. The image processing unit 470 includes the CPU interface 310, the FIFO memory unit 318, and the color adjustment unit 320, which are included in the DMA controller 220 of FIG. 17. The image processing unit 470 is further provided with a image composition control unit 474 in place of the DMA control unit 316.

FIGS. 35(a) through 35(h) are timing charts showing the DMA transfer operation for scanning lines in the third embodiment. When an instruction to display a moving picture is given from the CPU 202 to the accelerator unit 460 and the image processing unit 470 (FIG. 35(a)), DMA transfer starts from a next pulse of the vertical synchronizing signal VSYNC. When video data for one scanning line are stored in one FIFO memory in the FIFO memory unit 318, the image composition control unit 474 outputs an interrupt signal /WINT to the DMA control unit 316 to request transfer of the video data for one scanning line. When the DMA control unit 316 outputs an interrupt acknowledge signal /INTACK to the image composition control unit 474, video data MDATA for one scanning line are output from the FIFO memory unit 318 and transferred to the VRAM 212 via the data output unit 314. At this moment, the address operation unit 312 determines the address MADDRESS as described before. In the operation of FIGS. 35(a) through 35(h), every time when video data MDATA for one scanning line are stored in the FIFO memory unit 318, the image composition control unit 474 supplies the interrupt signal /WINT to the DMA control unit 316 to request DMA transfer of the video data for the scanning line.

FIGS. 36(a) through 36(h) are timing charts showing the DMA transfer operation for data words in the third embodiment. The operation of FIGS. 36(a) through 36(h) are similar to that of FIGS. 35(a) through 35(h) except that the interrupt signal /WINT and the interrupt acknowledge signal /INTACK are generated at every word.

The third embodiment, where the accelerator unit 440 includes the DMA control unit 316, the address operation unit 312, and the data output unit 314, attains substantially the same effects as those of the second embodiment.

Although the second and third embodiments include a video accelerator, the present invention is also applicable to a computer system without a video accelerator.

M. Fourth Embodiment

Figure 37:
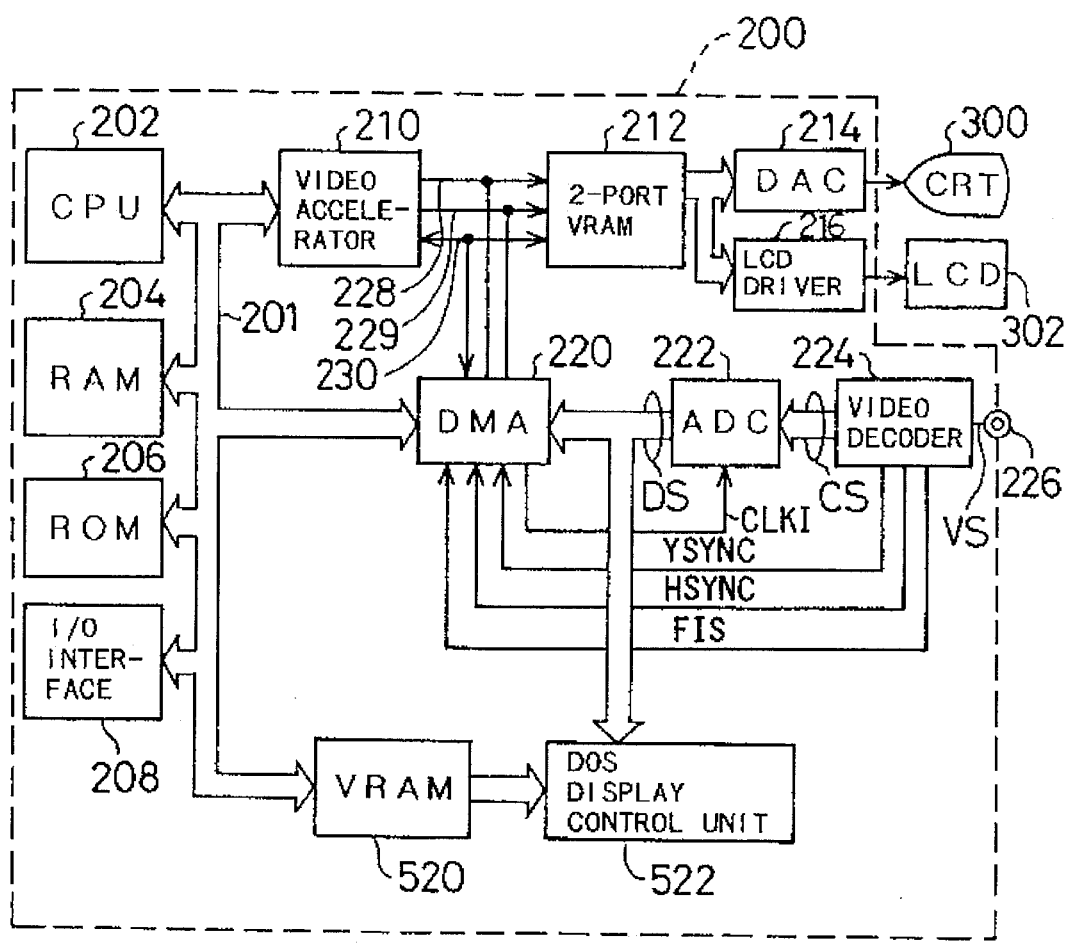
FIG. 37 is a block diagram showing a structure of a computer system as a fourth embodiment of the invention.

FIG. 37 is a block diagram showing the structure of a computer system as a fourth embodiment of the present invention. The computer system comprises a VRAM 520 as a second video memory and a DOS display control unit 522 as a video data conversion means, as well as the elements shown in FIG. 16.

This computer system operates under two Operating Systems (hereinafter referred to as "OS"). The dual port VRAM 212 as a first video memory is managed by a first OS such as MS-Windows (trademark of Microsoft Corp.), and the VRAM 520 as a second video memory is managed by a second OS such as MS-DOS (trademark of Microsoft Corp.).

The video data in the VRAM 520 has a different data format from that in the dual port VRAM 212. The video data stored in the dual port VRAM 212 are bit map data which represent red, green and blue at each dot on the display device (the color CRT 300 and the color LCD 302), where each color is expressed by eight bits. The VRAM 520 comprises a text VRAM and a graphic VRAM. The text VRAM stores character codes representing character images, and attribute data representing attributes of each character such as color, inversion, and blinking. A color of each character is, for example, specified by 3 bits of the attribute data representing eight colors. The graphic VRAM stores bit map data representing a graphic image with respect to each dot. The graphic bit map data may be 3 bit data indicating eight colors, or four bit data indicating sixteen colors.

The DOS display control unit 522 works as a video data conversion means for converting the data format of the video data stored in the VRAM 520 to that in the dual port VRAM 212. In order to attain this function, the DOS display control unit 522 comprises a character generator for convening the character codes to bit map data, an attribute generator for giving attributes to each character, and a color palette for convening color of graphic data, and a video multiplexer for combining character images and graphics. The video data converted by the DOS display control unit 522 is transferred to the dual port VRAM 212 by the DMA controller 220.

Figure 38A:
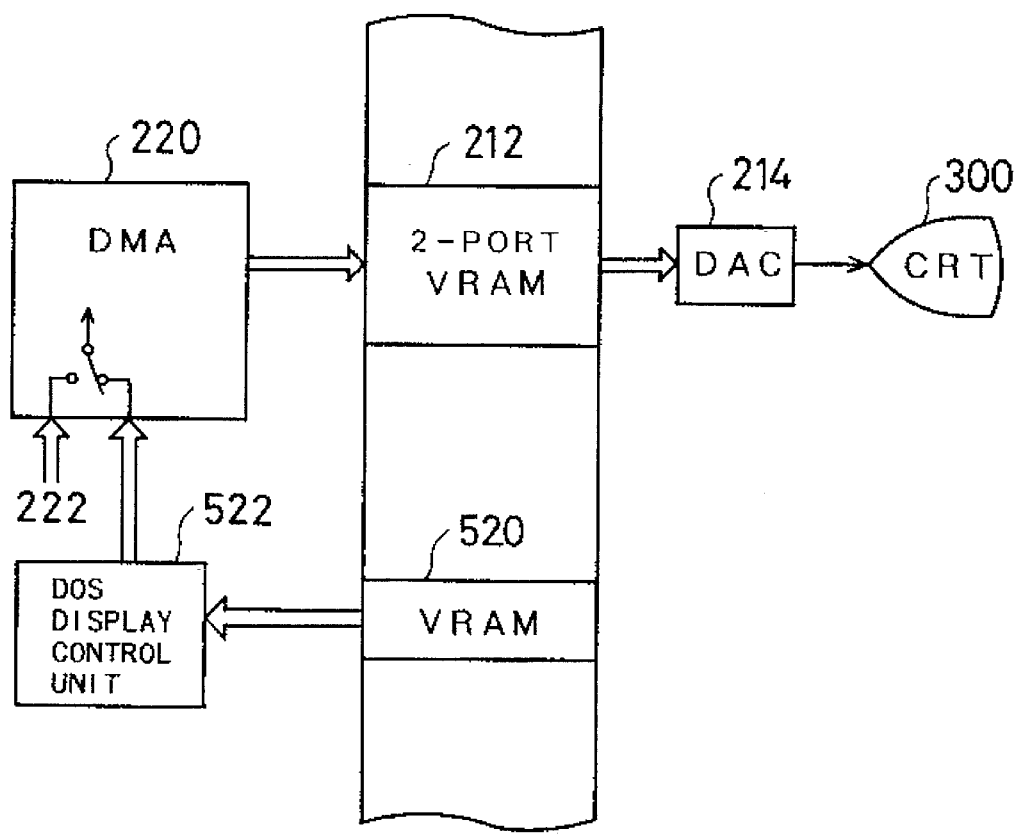
FIGS. 38(A) and 38(B) schematically illustrate data transfer between two VRAMs through a DOS display control unit 522.
Figure 38B:
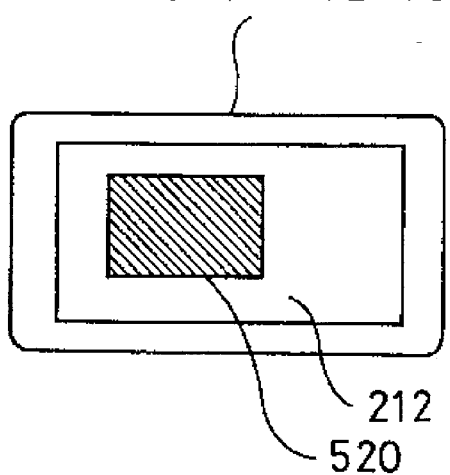
Figure 39:
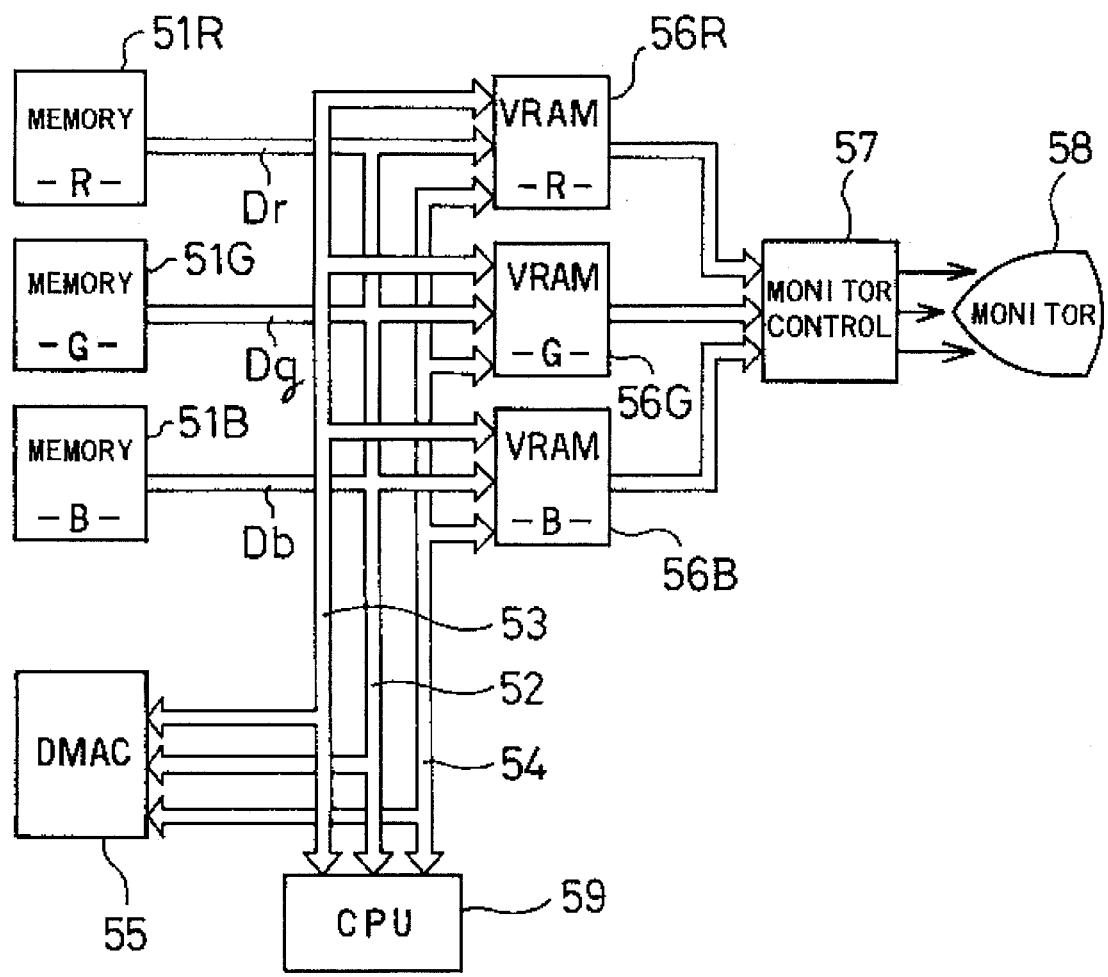
FIG. 39 is a block diagram showing a computer system having a DMA controller according to the prior art.

FIGS. 38(A) and 38(B) schematically illustrate the data transfer path from the VRAM 520 to the dual port VRAM 212. As shown in FIG. 38(A), the video data stored in the VRAM 520 is converted with respect to the data format by the DOS display control unit 522, and supplied to the DMA controller 220. The DMA controller 220 transfers the video data supplied from the DOS display control unit 522 to the dual port VRAM 212 according to the procedure described in the second embodiment. The video data stored in the dual port VRAM 212 is supplied to the display devices to display a moving picture image. As shown in FIG. 38(B), a display area corresponding to the VRAM 520 is preferably smaller than that of the dual port VRAM 212. In this case, the video image stored in the VRAM 520 is displayed on a part of the screen of the display device. The display area for the VRAM 520 as shown in FIG. 38(B), which is managed by MS-DOS, is called "DOS-BOX" in the MS-Windows system.

The computer system of the fourth embodiment can transfer the video data from the VRAM 520 to the dual port VRAM 212 with the DMA controller 220 at a high speed while converting the data format. Since the data format conversion is executed by hardware circuits in the DOS display control unit 522, it is executed at much higher speed than the conversion by the CPU 202. Further, the video image represented by the video data stored in the VRAM 520 can be expanded and reduced in the DMA transfer operation in the same manner as described before for the second embodiment.

Although the two VRAMs 212 and 520 are managed by different OSs in the fourth embodiment, the two VRAMs may be managed by one OS. The present invention is generally applicable to the computer system which comprises two or more VRAMs for storing different data formats.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer system comprising:

a video memory for storing video data;

a micro processor for controlling writing and reading of said video data into and out of said video memory;

a bus for electrically connecting said video memory with said micro-processor; and DMA transfer means for obtaining a right of use of said but from said micro-processor, and outputting onto said bus said video data and a transfer address corresponding to a desired memory region in said video memory so as to implement DMA transfer of said video data to said video memory, said DMA transfer means comprising:

first variable magnification means for changing a vertical magnification of a video image represented by said video data through adjusting a vertical address of said transfer address; and second variable magnification means for changing a horizontal magnification of said video image represented by said video date through adjusting a frequency of a dot clock signal indicative of up-date timing of a vertical address of said transfer address.

2. A computer system in accordance with claim 1, wherein said DMA transfer means further comprises:

a first memory for storing an offset address indicating a start position of said desirable memory area in said video memory;

a second memory for storing an adding address indicating a difference between addresses of two scanning lines adjacent to each other in said video memory;

first operation means for calculating a vertical address as a function of vertical and horizontal synchronizing signals synchronous with said video data, said vertical address being equal to a value of said adding address multiplied by a scanning line number indicating an ordinal number of a scanning line in said video image, said scanning line number being specified by the number of pulses of said horizontal synchronizing signal given to said first operation means;

a horizontal counter for generating a horizontal address indicating a difference of an address between an initial position of each scanning line in said video image and each pixel on said each scanning line;

second operation means for adding said vertical address, said horizontal address, and said offset address to obtain said transfer address indicating an address in said video memory corresponding to a position of said each pixel on said each scanning line in said video image, and outputting said transfer address onto said bus; and data output means for outputting onto said bus said video data to be transferred to said video memory according to said transfer address.

3. A computer system in accordance with claim 2, wherein said data output means comprises:
- a plurality of video data buffers, each video data buffer storing a predetermined amount of said video data; and
- buffer control means for selecting at least one video data buffer for writing in said video data and at least another video data buffer for reading out said video data, among said plurality of video data buffers in a predetermined order and activating said selected video data buffers.

4. A computer system in accordance with claim 3, wherein said first variable magnification means comprises:
- line increment signal generation means for generating a line increment signal whose frequency is $N_V$ times a frequency of said vertical synchronizing signal, based on at least one of said vertical synchronizing signal and said horizontal synchronizing signal; and
- said first operation means comprises means for adding the number of pulses of said line increment signal generated during latest two pulses of said horizontal synchronizing signal to said scanning line number, in response to each pulse of said horizontal synchronizing signal; and
- whereby a video image represented by said video data transferred to said video memory can be reduced in a vertical direction by adjusting a value of said $N_V$ used in said line increment signal generation means.

5. A computer system in accordance with claim 3, wherein said first variable magnification means comprises:
- input clock generation means for generating an input clock signal whose frequency is $N_{HO}$ times a frequency of said horizontal synchronizing signal, and supplying said input clock signal as a write-in synchronizing signal to said one video data buffer selected for writing in said video data; and
- output clock generation means for generating an output clock signal whose frequency is HX times the frequency of said input clock signal, where HX is an integer, and supplying said output clock signal as a read-out synchronizing signal to said another video data buffer selected for reading out said video data; and
- whereby a video image represented by said video data read out of said plurality of video data buffers being expanded in the vertical direction by adjusting a value of HX used in said output clock generation means.

6. A computer system in accordance with claim 3, wherein said second variable magnification means further comprises:
- dot clock generation means for generating a dot clock signal whose frequency is $N_H$ times a frequency of said horizontal synchronizing signal, said dot clock signal being used as a synchronizing signal in writing into said video memory said video data which is read out of said plurality of video data buffers; and
- whereby a video image represented by said video data transferred to said video memory can be reduced and expanded in a horizontal direction by adjusting a value of $N_H$ used in said dot clock generation means.

7. A computer system comprising
a CPU;
a first video memory for storing video data representing a video image;
a video accelerator for controlling writing and reading of said video data into and out of said first video memory;
a local bus for electrically connecting said first video memory with said video accelerator; and
video data transfer means for transferring said video data into a desired memory region in said first video memory, said video data transfer means comprising
- a first memory for storing an offset address indicating a start position of said desirable memory area in said first video memory;
- a second memory for storing an adding address indicating a difference between addresses of two scanning lines adjacent to each other in said first video memory;
- first operation means for calculating a vertical address as a function of vertical and horizontal synchronizing signals synchronous with said video data, said vertical address being equal to a value of said adding address multiplied by a scanning line number indicating an ordinal number of a scanning line in said video image, said scanning line number being specified by the number of pulses of said horizontal synchronizing signal given to said first operation means;
- a horizontal counter for generating a horizontal address indicating a difference of an address between an initial position of each scanning line in said video image and each pixel on said each scanning line;
- second operation means for adding said vertical address, said horizontal address, and said offset address to obtain a transfer address indicating an address in said first video memory corresponding to a position of said each pixel on said each scanning line in said video image, and outputting said transfer address onto said local bus; and
- data output means for outputting onto said local bus said video data to be transferred to said first video memory according to said transfer address.

8. A computer system in accordance with claim 7, wherein said first operation means comprises:
- scanning line generation means for generating said scanning line number from the number of pulses of said horizontal synchronizing signal; and
- a multiplier for multiplying said scanning line number by said adding address to generate said vertical address.

9. A computer system in accordance with claim 7, wherein said first operation means comprises:
- an adder for accumulating said adding address by a certain number equal to the number of pulses of said horizontal synchronizing signal given, to generate said vertical address.

10. A computer system in accordance with claim 7, wherein said video data transfer means further comprises:
- bus control means for obtaining a right of use of said local bus from said video accelerator, and returning the right of use of said local bus to said video accelerator.

11. A computer system in accordance with claim 10, further comprising:
- decoder means for decoding a given composite video signal to generate a component video signal, said vertical synchronizing signal, and said horizontal synchronizing signal; and
- an analog-to-digital converter for converting said component video signal to said video data.

12. A computer system in accordance with claim 7, wherein said data output means further comprises:
- a plurality of video data buffers, each video data buffer storing a predetermined amount of said video data; and
- buffer control means for selecting at least one video data buffer for writing in said video data and at least another video data buffer for reading out said video data, among said plurality of video data buffers in a predetermined order and activating said selected video data buffers.

13. A computer system in accordance with claim 12, wherein said buffer control means comprises:

line increment signal generation means for generating a line increment signal whose frequency is $N_V$ times a frequency of said vertical synchronizing signal, based on at least one of said vertical synchronizing signal and said horizontal synchronizing signal; and said first operation means comprises means for adding the number of pulses of said line increment signal generated during latest two pulses of said horizontal synchronizing signal to said scanning line number, in response to each pulse of said horizontal synchronizing signal; and whereby a video image represented by said video data transferred to said first video memory can be reduced in a vertical direction by adjusting a value of $N_V$ used in said line increment signal generation means.

14. A computer system in accordance with claim 12, wherein said buffer control means comprises:

input clock generation means for generating an input clock signal whose frequency is $N_{HO}$ times a frequency of said horizontal synchronizing signal, and supplying said input clock signal as a write-in synchronizing signal to said one video data buffer selected for writing in said video data; and output clock generation means for generating an output clock signal whose frequency is HX times the frequency of said input clock signal, where HX is an integer, and supplying said output clock signal as a read-out synchronizing signal to said another video data buffer selected for reading out said video data; and whereby a video image represented by said video data read out of said plurality of video data buffers being expanded in the vertical direction by adjusting a value of HX used in said output clock generation means.

15. A computer system in accordance with claim 12, wherein said buffer control means comprises:

dot clock generation means for generating a dot clock signal whose frequency is $N_H$ times a frequency of said horizontal synchronizing signal, said dot clock signal being used as a synchronizing signal in writing into said first video memory said video data which is read out of said plurality of video data buffers; and whereby a video image represented by said video data transferred to said first video memory can be reduced and expanded in a horizontal direction by adjusting a value of $N_H$ used in said dot clock generation means.

16. A video data transfer apparatus, for use in a computer system comprising a video memory for storing video data representing a video image, a micro processor for controlling writing and reading of said video data into and out of said video memory, and a bus for electrically connecting said video memory with said micro-processor, for transferring said video data into a desired memory region in said video memory, said apparatus comprising:

a first memory for storing an offset address indicating a start position of said desirable memory area in said video memory;

a second memory for storing an adding address indicating a difference between addresses of two scanning lines adjacent to each other in said video memory;

first operation means for calculating a vertical address as a function of vertical and horizontal synchronizing signals synchronous with said video data, said vertical address being equal to a value of said adding address multiplied by a scanning line number indicating an ordinal number of a scanning line in said video image, said scanning line number being specified by the number of pulses of said horizontal synchronizing signal given to said first operation means;

a horizontal counter for generating a horizontal address indicating a difference of an address between an initial position of each scanning line in said video image and each pixel on said each scanning line;

second operation means for adding said vertical address, said horizontal address, and said offset address to obtain a transfer address indicating an address in said video memory corresponding to a position of said each pixel on said each scanning line in said video image, and outputting said transfer address onto said bus;

data output means for outputting onto said bus said video data to be transferred to said video memory according to said transfer address;

first variable magnification means for changing a vertical magnification of a video image represented by said video data; and second variable magnification means for changing a horizontal magnification of said video image represented by said video data.

17. A video data transfer apparatus in accordance with claim 16, wherein said data output means comprises:

a plurality of video data buffers, each video data buffer storing a predetermined amount of said video data; and buffer control means for selecting at least one video data buffer for writing in said video data and at least another video data buffer for reading out said video data, among said plurality of video data buffers in a predetermined order and activating said selected video data buffers.

18. A video data transfer unit in accordance with claim 17, wherein said first variable magnification means comprises:

line increment signal generation means for generating a line increment signal whose frequency is $N_V$ times a frequency of said vertical synchronizing signal, based on at least one of said vertical synchronizing signal and said horizontal synchronizing signal; and said first operation means comprises means for adding the number of pulses of said line increment signal generated during latest two pulses of said horizontal synchronizing signal to said scanning line number, in response to each pulse of said horizontal synchronizing signal; and whereby a video image represented by said video data transferred to said video memory can be reduced in a vertical direction by adjusting a value of said $N_V$ used in said line increment signal generation means.

19. A video data transfer apparatus in accordance with claim 17, wherein said first variable magnification means comprises:

input clock generation means for generating an input clock signal whose frequency is $N_{HO}$ times a frequency of said horizontal synchronizing signal, and supplying said input clock signal as a write-in synchronizing signal to said one video data buffer selected for writing in said video data; and output clock generation means for generating an output clock signal whose frequency is HX times the frequency of said input clock signal, where HX is an integer, and supplying said output clock signal as a read-out synchronizing signal to said another video data buffer selected for reading out said video data; and whereby a video image represented by said video data read out of said plurality of video data buffers being expanded in the vertical direction by adjusting a value of HX used in said output clock generation means.

20. A video data transfer apparatus in accordance with claim 17, wherein said second variable magnification means comprises:

dot clock generation means for generating a dot clock signal whose frequency is $N_H$ times a frequency of said horizontal synchronizing signal, said dot clock signal being used as a synchronizing signal in writing into said video memory said video data which is read out of said plurality of video data buffers; and whereby a video image represented by said video data transferred to said video memory can be reduced and expanded in a horizontal direction by adjusting a value of $N_H$ used in said dot clock generation means.

21. A computer system in accordance with claim 1, further comprising:

a second video memory for storing another video data which has a second data format different from a first data format of said video data stored in said first video memory; and video data conversion means for converting said second video data stored in said second video memory from said second data format to said first data format, and supplying the convened video data to said video data transfer means.

* * * * *

UNITED STATES PATENT AND TRADEMARK OFFICE
CERTIFICATE OF CORRECTION

PATENT NO.  : 5,585,864
DATED       : December 17, 1996
INVENTOR(S) : Kesatoshi TAKEUCHI It is certified that error appears in the above-indentified patent and that said Letters Patent is hereby corrected as shown below:

On the title page, Item [30], the Foreign Application Priority Data, should read:

--Jun. 24, 1992   [JP] Japan.....4-166031
  Mar. 25, 1993   [JP] Japan.....5-66833
  Jun. 14, 1993   [JP] Japan.....5-168744
  Mar.  7, 1994   [JP] Japan.....6-064519
  Apr. 27, 1994   [JP] Japan.....6-113520--

Signed and Sealed this

First Day of April, 1997

Attest:

BRUCE LEHMAN

*Attesting Officer*                *Commissioner of Patents and Trademarks*

UNITED STATES PATENT AND TRADEMARK OFFICE
CERTIFICATE OF CORRECTION

PATENT NO. : 5,585,864
DATED : December 17, 1996
INVENTOR(S) : KESATOSHI TAKEUCHI It is certified that error appears in the above-indentified patent and that said Letters Patent is hereby corrected as shown below:

In the claims, Col. 34, Claim 21, please change claim dependency "Claim 1" to --Claim 7--;

Same claim, next to last line of Claim 21, change "convened" to --converted--.

Signed and Sealed this

Tenth Day of June, 1997

Attest:

BRUCE LEHMAN

*Attesting Officer*  *Commissioner of Patents and Trademarks*